(12) United States Patent
Jeong et al.

(10) Patent No.: US 9,883,400 B2
(45) Date of Patent: Jan. 30, 2018

(54) METHOD FOR SUBSCRIPTION AND NOTIFICATION IN M2M COMMUNICATION SYSTEM AND DEVICE THEREFOR

(71) Applicant: LG ELECTRONICS INC., Seoul (KR)

(72) Inventors: Seungmyeong Jeong, Seoul (KR); Seungkyu Park, Seoul (KR); Seongyun Kim, Seoul (KR); Hongbeom Ahn, Seoul (KR); Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 15/023,193

(22) PCT Filed: Nov. 6, 2014

(86) PCT No.: PCT/KR2014/010616
§ 371 (c)(1),
(2) Date: Mar. 18, 2016

(87) PCT Pub. No.: WO2015/069038
PCT Pub. Date: May 14, 2015

(65) Prior Publication Data
US 2016/0234691 A1    Aug. 11, 2016

Related U.S. Application Data

(60) Provisional application No. 62/009,929, filed on Jun. 10, 2014, provisional application No. 61/994,062, (Continued)

(51) Int. Cl.
*H04L 29/06* (2006.01)
*H04W 12/08* (2009.01)
(Continued)

(52) U.S. Cl.
CPC ............. *H04W 12/08* (2013.01); *H04L 63/10* (2013.01); *H04W 4/005* (2013.01); *H04W 8/18* (2013.01); *H04W 68/00* (2013.01)

(58) Field of Classification Search
CPC ..... H04W 12/08; H04W 68/00; H04W 4/005; H04W 8/18; H04L 63/10
See application file for complete search history.

(56) References Cited

U.S. PATENT DOCUMENTS

2010/0106967 A1* 4/2010 Johansson ................. H04L 9/12
713/158
2011/0128911 A1* 6/2011 Shaheen ............... H04L 63/104
370/328

(Continued)

FOREIGN PATENT DOCUMENTS

KR    10-2012-0096528 A    8/2012
KR    10-2013-0016613 A    2/2013
(Continued)

*Primary Examiner* — Morshed Mehedi
(74) *Attorney, Agent, or Firm* — Birch, Stewart, Kolasch & Birch, LLP

(57) ABSTRACT

The present invention relates to a message processing method for resource subscription in a machine-to-machine (M2M) system and a device therefor, and the method comprises the steps of: receiving a subscription request message for a subscribed-to resource from a first device, wherein the subscription request message includes identification information of the first device and identification information of a second device; checking whether the first device has a right for the subscribed-to resource; determining whether the first device and the second device are the same on the basis of the identification information of the first device and the identification information of the second device; transmitting a notification message including the identification information of the first device, identification information of an M2M device, and parameter information (Continued)

for indicating a verification request to the second device, if the first device and the second device are different; and receiving a response message to the notification message from the second device; wherein a right for the subscription request is checked by the second device on the basis of the identification information of the first device and the identification information of the M2M device, and the response message includes a result of the checking of the right by the second device.

15 Claims, 17 Drawing Sheets

Related U.S. Application Data filed on May 15, 2014, provisional application No. 61/992,917, filed on May 14, 2014, provisional application No. 61/977,629, filed on Apr. 10, 2014, provisional application No. 61/973,790, filed on Apr. 1, 2014, provisional application No. 61/910,129, filed on Nov. 29, 2013, provisional application No. 61/901,453, filed on Nov. 8, 2013.

(51) Int. Cl.
*H04W 8/18* (2009.01)
*H04W 4/00* (2009.01)
*H04W 68/00* (2009.01)

(56) References Cited

U.S. PATENT DOCUMENTS

| | | | | |
|---|---|---|---|---|
| 2013/0066965 | A1* | 3/2013 | Foti | H04L 67/24 709/204 |
| 2014/0237101 | A1* | 8/2014 | Park | H04L 67/303 709/223 |
| 2014/0242940 | A1* | 8/2014 | Koo | H04L 67/125 455/406 |
| 2014/0245398 | A1* | 8/2014 | Son | H04L 63/10 726/4 |
| 2014/0317707 | A1* | 10/2014 | Kim | H04W 12/04 726/6 |

FOREIGN PATENT DOCUMENTS

| | | |
|---|---|---|
| KR | 10-1274966 B1 | 7/2013 |
| WO | WO 2012/068465 A1 | 5/2012 |

\* cited by examiner

METHOD FOR SUBSCRIPTION AND NOTIFICATION IN M2M COMMUNICATION SYSTEM AND DEVICE THEREFOR

CROSS REFERENCE TO RELATED APPLICATIONS

This application is the National Phase of PCT International Application No. PCT/KR2014/010616, filed on Nov. 6, 2014, which claims priority under 35 U.S.C. 119(e) to U.S. Provisional Application No. 61/901,453, filed on Nov. 8, 2013, 61/910,129, filed on Nov. 29, 2013, 61/973,790, filed on Apr. 1, 2014, 61/977,629, filed on Apr. 10, 2014, 61/992,917, filed on May 14, 2014, 61/994,062, filed on May 15, 2014, and 62/009,929, filed on Jun. 10, 2014, all of which are hereby expressly incorporated by reference into the present application.

TECHNICAL FIELD

The present invention pertains to a wireless communication system, in particular, changing a gateway in a machine-to-machine (M2M) system.

BACKGROUND ART

Recently, interest in M2M (machine-to-machine) communication is rising. The M2M communication corresponds to communication performed between machines without a human involvement. The M2M communication is also called MTC (machine type communication) or IoT (internet of things) communication. A terminal used for the M2M communication is called a M2M device. In general, the M2M device has characteristics such as low mobility, time tolerant or delay tolerant, small data transmission and the like. The M2M device is used in a manner of being connected with a M2M server, which stores and manages M2M communication information at the center. If a M2M device is connected according to a communication scheme different from each other, the M2M device and the M2M server are connected with each other via a M2M gateway in a section where a communication scheme is changed. In doing so, a whole M2M system can be constructed. Such a service as object tracking, power metering, automatic payment system, healthcare service, remote controlling, and the like can be provided by the M2M system.

The present invention relates to a M2M system.

DISCLOSURE OF THE INVENTION

Technical Tasks

An object of the present invention is to provide a method of efficiently transmitting and receiving a signal in an M2M system and an apparatus therefor.

Another object of the present invention is to provide a method of efficiently performing privilege check in an M2M system and an apparatus therefor.

Another object of the present invention is to provide a method of preventing a vicious assault using a subscription/communication mechanism in an M2M system and an apparatus therefor.

Another object of the present invention is to provide a method of preventing a right of a device hosting a specific resource from being used without permission in an M2M system and an apparatus therefor.

The other object of the present invention is to provide a method of preventing network load from being increased and/or preventing system capability from being deteriorated by avoiding vicious use of a subscription/communication mechanism or use of the subscription/communication mechanism without permission in an M2M system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, provided herein is a method of processing a message for resource subscription by an M2M (machine-to-machine) device, the method comprising: receiving a subscription request message for a subscription target resource from a first device, wherein the subscription request message includes identification information of the first device and identification information of a second device, checking whether or not the first device has a right for the subscription target resource, determining whether or not the first device and the second device are identical to each other based on the identification information of the first device and the identification information of the second device, when the first device and the second device are different from each other, transmitting a notification message to the second device, the notification message including the identification information of the first device, identification information of the M2M device, and parameter information indicating a verification request, and receiving a response message from the second device in response to the notification message, wherein privilege check for the subscription request is performed by the second device based on the identification information of the first device and the identification information of the M2M device, and wherein the response message comprises a result of the privilege check performed by the second device.

In another aspect of the present invention, provided herein is an M2M (machine-to-machine) device, the M2M device comprising: a network interface unit; and a processor operatively connected to the network interface unit, the processor configured to receive a subscription request message for a subscription target resource from a first device, wherein the subscription request message includes identification information of the first device and identification information of a second device, check whether or not the first device has a right for the subscription target resource, determine whether or not the first device and the second device are identical to each other based on the identification information of the first device and the identification information of the second device, the processor, when the first device and the second device are different from each other, configured to transmit a notification message to the second device, the notification message including the identification information of the first device, identification information of the M2M device, and parameter information indicating a verification request, and receive a response message from the second device in response to the notification message, wherein privilege check for the subscription request is performed by the second device based on the identification information of the first device and the identification information of the M2M device, and wherein the response message comprises a result of the privilege check performed by the second device.

Preferably, the privilege check performed by the second device may include checking whether or not the M2M device has a right capable of transmitting a notification message to the second device.

Preferably, the privilege check performed by the second device can include checking whether or not the first device has a right capable of configuring subscription for transmitting a notification message to the second device.

Preferably, the method may further include transmitting a temporary acceptance message for the subscription request message to the first device before the step of transmitting the notification message to the second device.

Preferably, the method may further include determining whether or not a result of the privilege check performed by the second device is successful, when the result of the privilege check is successful, transmitting a subscription grant message to the first device, and when the result of the privilege check is failure, cancelling the resource subscription.

Preferably, the method may further include, when the result of the privilege check is failure, transmitting a message for indicating that the resource subscription has been canceled to the first device.

Preferably, the subscription request message includes subscription information for creating a subscription resource in the M2M device and the method can further include temporarily storing the subscription information.

Preferably, the subscription request message includes subscription information for creating a subscription resource in the M2M device and the method may further include creating a subscription resource based on the subscription information.

Preferably, the identification information of the first device may be stored in creator attribute information of the subscription resource.

Preferably, the notification message may be generated when a notification event occurs in the M2M device and the notification event may include a status change of the subscription target resource.

Preferably, the notification message may be generated in the M2M device irrespective of an occurrence of a notification event.

Preferably, the identification information of the first device includes address information indicating an originator of the subscription request message and the identification information of the second device can include address information indicating a notification target of the notification message.

Preferably, the resource may correspond to a data structure capable of being uniquely addressed using a unique address.

Preferably, response message type information of the subscription request message can indicate one of a blocking request, a synchronous non-blocking request, or an asynchronous non-blocking request.

Advantageous Effects

According to the present invention, it is able to efficiently transmit and receive a signal in an M2M system.

According to the present invention, it is able to efficiently perform privilege check in an M2M system.

According to the present invention, it is able to prevent a vicious assault using a subscription/communication mechanism in an M2M system.

According to the present invention, it is able to prevent a right of a device hosting a specific resource from being used without permission in an M2M system.

According to the present invention, it is able to prevent network load from being increased and/or prevent system capability from being deteriorated by avoiding vicious use of a subscription/communication mechanism or use of the subscription/communication mechanism without permission in an M2M system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

MODE FOR INVENTION

The preferred embodiments of the present invention will now be described in detail with reference to the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be implemented without such specific details.

When describing the present invention, in order to avoid obscuring the concepts of the present invention, a well-known structure or device may be omitted and important functions of the structures and devices may be shown in a form of block diagram. The same reference numbers will be used throughout the drawings to refer to the same or like parts.

In the present invention, a machine-to-machine (M2M) device refers to a device for M2M communication. The M2M device may be fixed or mobile. The M2M device may transmit and receive user data and/or control information to/from a M2M server by communicating with the M2M server. The M2M device may be referred to as terminal equipment, Mobile Station (MS), Mobile Terminal (MT), User Terminal (UT), Subscriber Station (SS), wireless device, Personal Digital Assistant (PDA), wireless modem, handheld device, etc. In the present invention, the M2M server may refer to a server for M2M communication, and may be implemented as a fixed station or a mobile station. In the present invention, when a network to which a M2M device is attached and a network to which a M2M server is attached are different from each other, a M2M gateway refers to an apparatus serving as a connection point entering from one network to the other network. Further, a M2M gateway may perform a function as a M2M device, and, for example, may perform a function such as managing a M2M device connected to the M2M gateway, receive one message and forward the message or a modified message to M2M devices connected to the M2M gateway, or a message aggregation. The term "M2M device" may be used to collectively refer to a M2M gateway and a M2M server, and thus a M2M gateway or a M2M server may be referred to as a M2M device.

In addition, in the present specification, the term "entity" may refer to a hardware such as a M2M device, a M2M gateway, or a M2M server, or the term "entity" may refer to a software component of M2M application layer or M2M (common) service layer as described below.

In the present specification, the present invention is described on the basis of a M2M system, but the present invention is not limited to the M2M system. For example, the present invention may be applied to a system in accordance with a client-server (or sender-responder) model in a similar/same manner.

Figure 1:
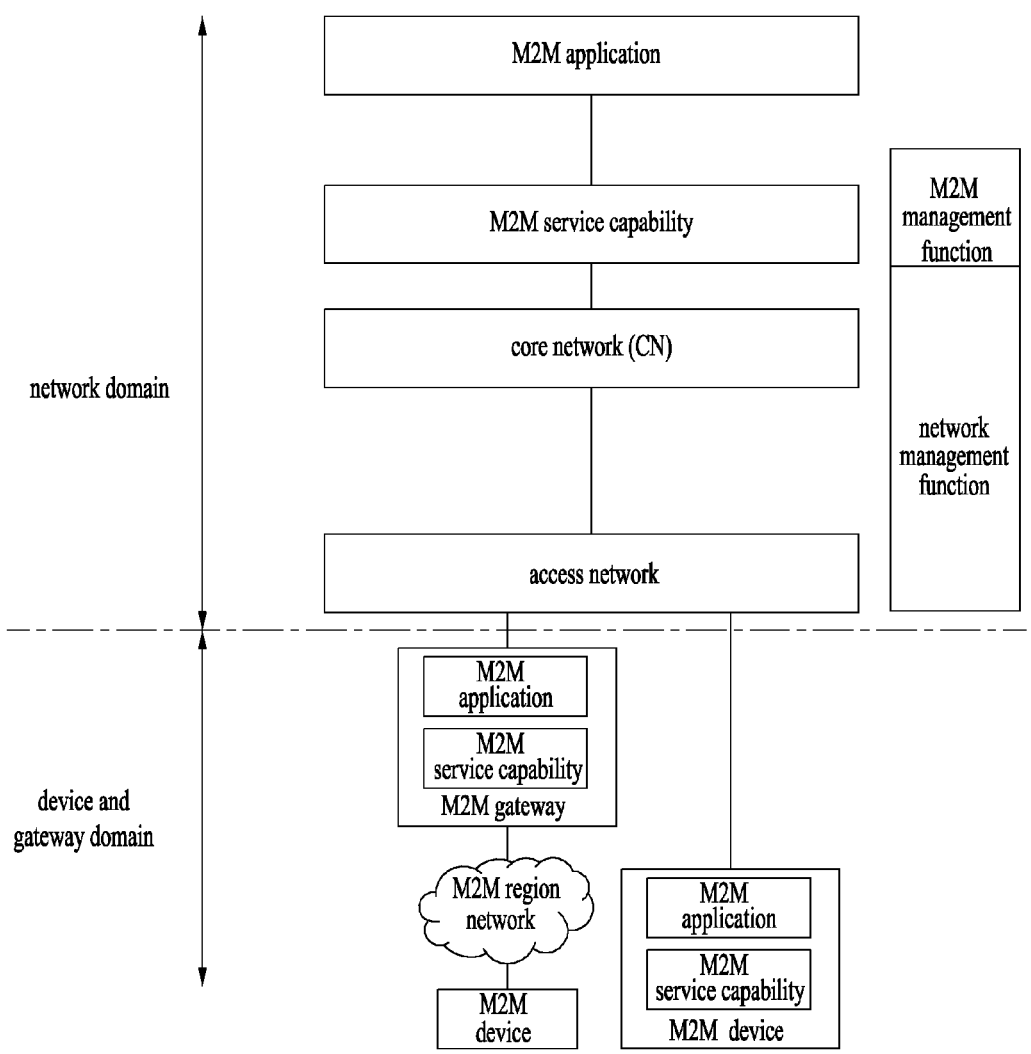
FIG. 1 illustrates an example of a M2M system.

FIG. 1 illustrates an example of a M2M system. FIG. 1 illustrates an example of a M2M system in accordance with ETSI (European telecommunications standards institute) TS (technical specification).

The M2M system in accordance with the ETSI TS defines a common M2M service framework for various M2M applications. A M2M application may indicate a software component implementing such a M2M service solution as e-health, city automation, a connected consumer, automotive and the like. The M2M system provides functions commonly required for implementing the various M2M applications, and the commonly required functions may be referred to as a M2M service or a M2M common service. If the M2M common service is used, a M2M application may be easily implemented without configuring a basic service framework again for each M2M application.

The M2M service is provided in a form of a set of service capability (SC), the M2M application may access the set of SC (service capability) via an open interface and may use a M2M service or function provided by the SC (service capability). SC may provide a function constructing a M2M service (e.g. device management, location, discovery, group management, registration, security, etc). A service capabilities layer (or SC layer) or a service capability entity (or SC entity) may correspond to a set of functions for a M2M service which may be used when a M2M application is provided on a service framework.

The SC (service capability) may be represented as xSC. In this case, x may be represented by one of N, G and D. The x indicates where the SC (service capability) exists among a network (and/or a server), a gateway and a device. For example, NSC indicates SC (service capability) existing in a network and/or a server, and GSC indicates SC (service capability) existing in a gateway.

A M2M application may exist in a network, a gateway or a device. The M2M application existing in a network or a directly connected with a server may be referred to as a M2M network application, or may be simply referred to as a NA (network application). For example, the NA corresponds to software which is implemented in a manner of being directly connected with a server, and the NA may perform a role of communicating with a M2M gateway or a M2M device and managing the M2M gateway and the M2M device. The M2M application existing in the device may be referred to as a M2M device application, or may be simply referred to as a DA (device application). For example, the DA corresponds to software which is implemented in a M2M device, and the DA may be able to deliver sensor information and the like to the NA. The M2M application existing in the gateway may be referred to as a M2M gateway application, or may be simply referred to as a GA (gateway application). For example, the GA may play a role of managing a M2M gateway, and the GA may provide a M2M service or function (e.g. SCs (service capabilities) or SC (service capability)) to the DA. The M2M application may collectively refer to an application entity (AE) or an application layer.

Referring to FIG. 1, a M2M system architecture may be divided into a network domain and a device and gateway domain. The network domain may include functions for M2M system management and functions for network management. The functions for the M2M system management may be performed by M2M SCs (service capabilities) and a M2M application managing device existing in the device and gateway domain. The function for network management may be performed by a core network and an access network. Hence, in the example shown in FIG. 1, the core network and the access network provide connection between entities rather than performing a M2M function. M2M communication may be performed between M2M SCs (service capabilities) in the network domain and the device and gateway domain via the core network and the access network. A M2M application of each domain may give and take a signal or information via M2M SCs (service capabilities) of a corresponding domain.

The access network corresponds to an entity enabling a M2M device and gateway domain to communicate with a core network. Examples of the access network include xDSL (digital subscriber line), HFC (hybrid fiber coax), satellite, GERAN, UTRAN, eUTRAN, wireless LAN, WiMAX and the like.

The core network corresponds to an entity providing a function such as IP (internet protocol) connection, service and network control, interconnection, roaming and the like. The core network includes a 3GPP (3rd generation partnership project) core network, an ETSI TISPAN (telecommunications and internet converged services and protocols for advanced networking) core network, a 3GPP2 core network, and the like.

M2M SC (service capability) provides a M2M common service function (CSF) capable of being shared by various M2M network applications, and exposures a M2M service via an open interface, thereby enabling M2M applications to use the M2M service. A layer including such M2M SC entities or M2M common service functions may be referred to as M2M SCL (service capability layer).

A M2M application corresponds to an entity operating service logic and being capable of using M2M SCs (service capabilities) via an open interface. A M2M application layer may refer to a layer including the M2M application and a related operational logic.

A M2M device corresponds to an entity operating a M2M device application via M2M SCs (service capabilities). The M2M device may directly communicate with a M2M server of a network domain, or may communicate with the M2M server of the network domain via a M2M gateway. In case of being connected via a M2M gateway, the M2M gateway operates like a proxy. The M2M device may include a M2M application and/or M2M SCs (service capabilities).

A M2M area network provides connectivity between a M2M device and a M2M gateway. In this case, a network between the M2M gateway and a M2M server and a network between the M2M device and the M2M gateway may be different from each other. For example, the M2M area network may be implemented using a PAN (personal area network) technology such as IEEE 802.15.1, Zigbee, Bluetooth, IETF ROLL, ISA 100.11a and a local network technology such as PLC (power line communication), M-BUS, wireless M-BUS, KNX and the like.

The M2M gateway is an entity managing a M2M application via M2M SCs (service capabilities) and providing a service to the M2M application. The M2M gateway may perform a role of a proxy between a M2M device and a network domain and may perform a role of providing a service to an ETSI non-compliant M2M device. The M2M gateway may refer to an entity having a function of a gateway among M2M devices. The M2M gateway may include a M2M application and/or M2M SCs (service capabilities).

The M2M architecture shown in FIG. 1 is just an example and a name of each entity may vary. For example, M2M SC (service capability) may be referred to as a M2M common service function (CSF), and a SCL (service capability layer) may be referred to as a common service layer (CSL) or common service entity (CSE). A M2M application may be referred to as an application entity (AE), and a M2M application layer may be simply referred to as an application layer. Similarly, a name of each domain may vary as well. For example, in one M2M system, a network domain may be referred to as an infrastructure domain, and a device and gateway domain may be referred to as a field domain.

As shown in FIG. 1, a M2M system may be construed as a layered structure including a M2M application layer and a M2M SC (service capability) layer for M2M communication.

Figure 2:
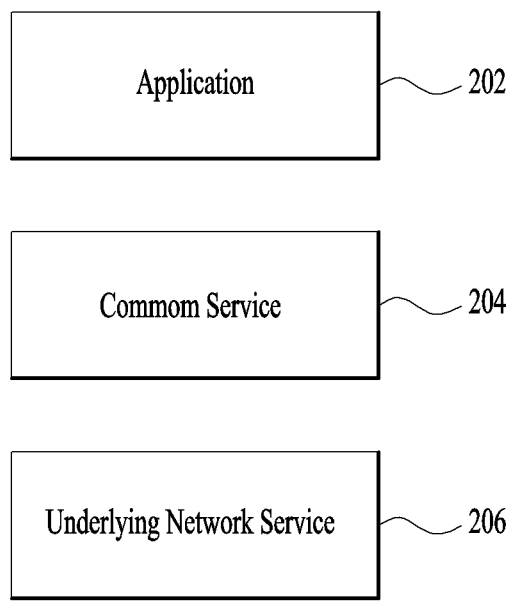
FIG. 2 illustrates an example of a layered structure of a M2M system.

FIG. 2 illustrates an example of a layered structure of a M2M system.

Referring to FIG. 2, a M2M system may include an application layer 202, a common service layer 204 and an underlying network services layer 206. As described in the above, application layer 202 may correspond to a M2M application layer, and common service layer 204 may correspond to a M2M SCL. Underlying network services layer 206 provides services such as device management, a location service and device triggering to common service layer 204 in a core network.

Figure 3:
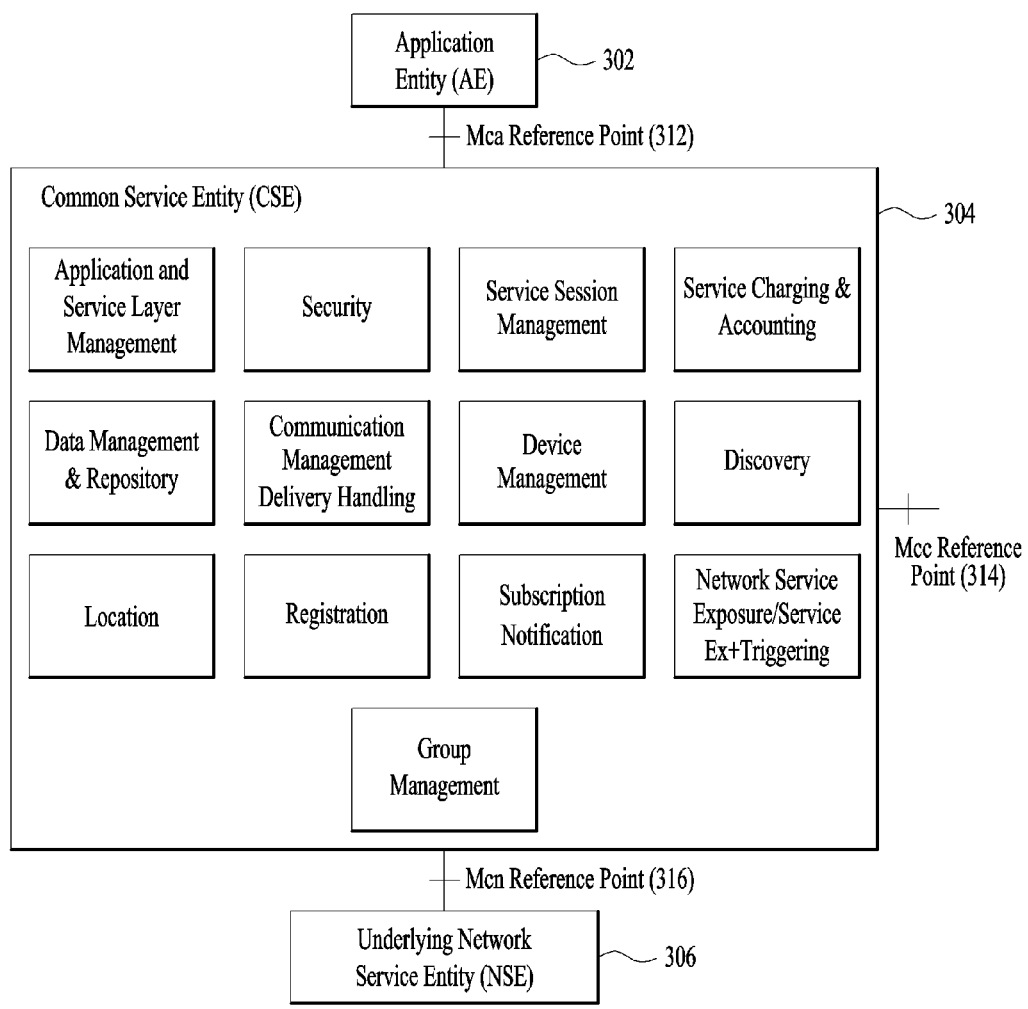
FIG. 3 illustrates an example of a functional architecture of a M2M system.

FIG. 3 illustrates an example of a functional architecture of a M2M system. In terms of functionality, M2M system architecture may include an application entity (AE) 302, a common service entity (CSE) 304, and an underlying network service entity (NSE) 306. Each of entities 302, 304, 306 may communicate with each other via a reference point supported by common service entity 304. The reference point plays a role in designating a communication flow between entities 302, 304, 306. The reference point may be represented as Mcx, and Mc means "M2M communications". In the present specification, a Mca reference point, a Mcc reference point and a Mcn reference point may be denoted as Mca, Mcc and Mcn, respectively.

Referring to FIG. 3, Mca reference point 312 designates a communication flow between application entity (AE) 302 and common service entity (CSE) 304. Mca reference point 312 enables AE 302 to use a service provided by CSE 304, and enables CSE 304 to communicate with AE 302. Mca reference point 312 may indicate an interface between a M2M application layer and a M2M common service layer (or entity).

Mcc reference point 314 designates a communication flow between different common service entities (CSEs) 304. Mcc reference point 314 enables CSE 304 to use a service of another CSE when CSE 304 provides a required function. A service provided by Mcc reference point 314 may be dependent on the functions supported by CSE 304. Mcc reference point 314 may indicate an interface between M2M common service layers.

Mcn reference point 316 designates a communication flow between CSE 304 and underlying network service entity (NSE) 306. In order to make CSE 304 provide a required function, Mcn reference point 316 enables the CSE to use a service provided by NSE 306. Mcn reference point 316 may indicate an interface between the M2M common service layer and the M2M underlying network layer.

In the example shown in FIG. 3, CSE 304 may provide various common service functions (CSFs). For example, CSE 304 may include at least one of an application and service layer management function, a communication management and delivery handling function, a data management and repository function, a device management function, a group management function, a discovery function, a location function, a network service exposure/service execution and triggering function, a registration function, a security function, a service charging and accounting function, a service session management function, or a subscription/notification function. CSE 304 represents an instance of the common service functions and provides a subset of the common service functions capable of being used and shared by M2M applications. The common service functions are briefly explained in the following.

Application and service layer management (ASM): provides a function of managing AEs and CSEs. For example, the ASM function may configure a function of a CSE, troubleshoot the function of the CSE, and upgrade the function Moreover, the ASN function may upgrade a function of an AE.

Communication management and delivery handling (CMDH): provides a communication with another CSEs, AEs and NSEs. For example, the CMDH function may determine when and how to use a connection for CSE-to-CSE communication and may control specific requests to be delivered in a manner of being delayed.

Data management and repository (DMR): enables M2M applications to exchange and share data with each other. For example, the DMR function may collect a great amount of data, aggregate the data with each other, convert the data into a specific format, and store the converted data.

Device management (DMG): manages a device function not only for a M2M gateway and a M2M device but also for devices existing in a M2M area network. For example, the DMG function may perform application installation and configuration, firmware update, logging, monitoring, diagnostics, network topology management and the like.

Discovery (DIS): searches for information such as information and a resource within a given range and condition according to a request.

Group management (GMG): For example, a group may be created by combining a resource, a M2M device or a M2M gateway with each other, this function handles a group-related request.

Location (LOC): This function enables a M2M application to obtain location information of a M2M device or a M2M gateway.

Network service exposure/service execution and triggering (NSSE): enables communication of an underlying network to be performed and makes a service or a function provided by the underlying network available.

Registration (REG): This function enables a M2M application or another CSE to register to a specific CSE. Registration is performed to use a M2M service function of the specific CSE.

Security (SEC): performs a role in handling of sensitive data such as a security key, establishing security-related association, authentication, authorization, protecting ID (identity) and the like.

Service charging and accounting (SCA): performs a role in providing a charging function to an AE or CSE.

Service session management (SSM): performs a role in managing a M2M session of a service layer for end-to-end communication.

Subscription/notification (SUB): in case of subscribing a change of a specific resource, when the resource is changed, performs a role of notifying the change.

Figure 4:
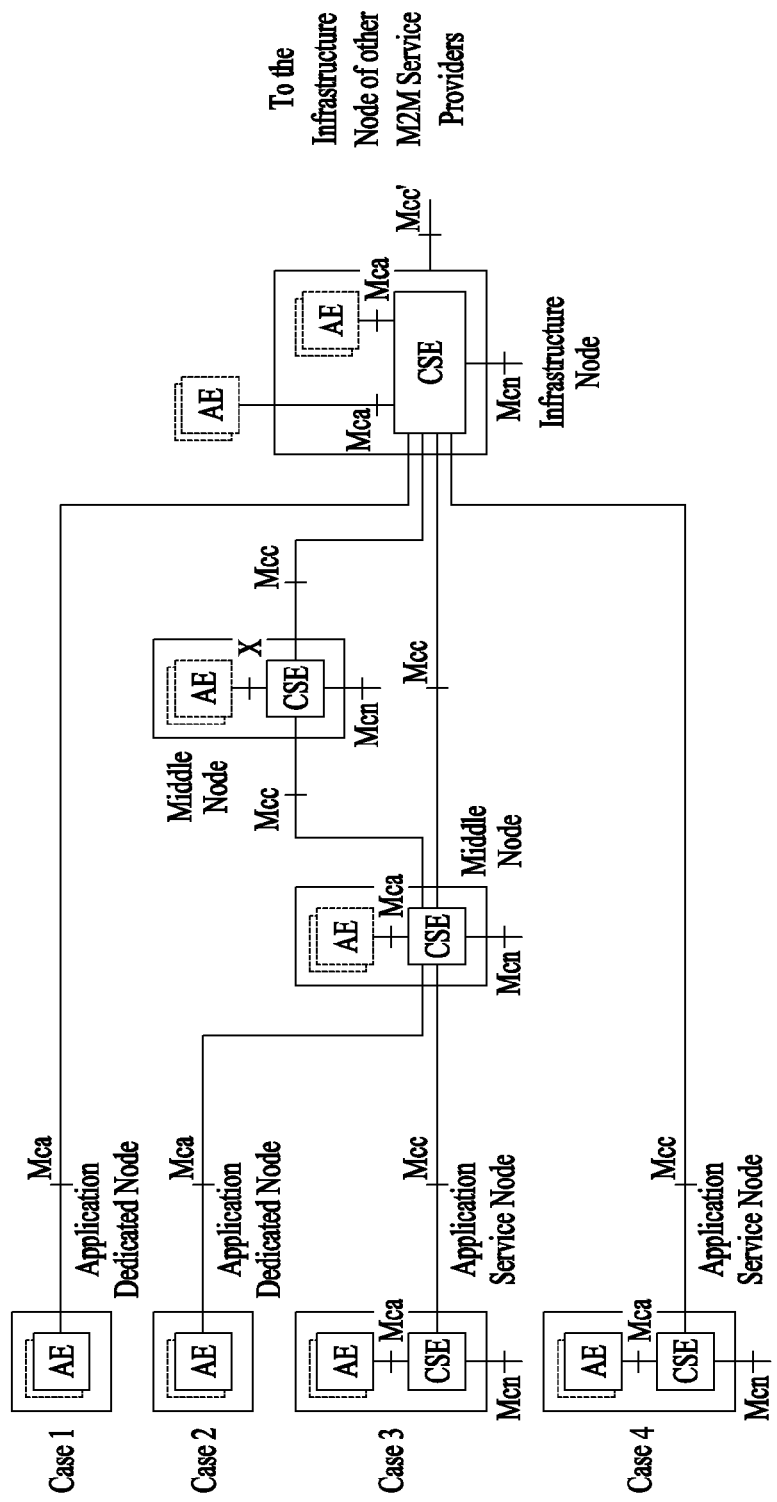
FIG. 4 illustrates an example of a M2M system configuration.

FIG. 4 illustrates an example of a M2M system configuration. In the present specification, a node corresponds to an entity including one or more M2M applications or an entity including one CSE and zero or more M2M application.

A node including at least one or more application entities (AEs) but not including a common service entity (CSE) may be referred to as an application dedicated node (ADN). The ADN may communicate with one middle node (MN) or one infrastructure node (IN) via a Mca. The ADN may be referred to as a M2M device having a constrained capability. In this case, the M2M device having a constrained capability may correspond to a M2M device not including a common service layer or a common service entity (CSE). The M2M device having a constrained capability may be simply referred to as a constrained M2M device.

A node having at least one common service entity (CSE) and at least one or more M2M application entity (AE) may be referred to as an application service node (ASN). The ASN may communicate with one middle node or one infrastructure node via a Mcc. The ASN may be referred to as a M2M device.

A node including one common service entity (CSE) and zero or more M2M application entity (AE) may be referred to as a middle node (MN). The MN may communicate with one infrastructure node (IN) or another middle node (MN) via a Mcc. Or, the MN may communicate with IN/MN/ASN via the Mcc. Or, the MN may communicate with an ADN via a Mca. The MN may be referred to as a M2M gateway.

A node having a common service entity (CSE) and including zero or more application entity (AE) may be referred to as an infrastructure node (IN). The IN may communicate with at least one middle node (MN) and/or at least one ASN. Or, the IN may communicate with one or more ADNs via a Mca. The IN may be referred to as a M2M server.

Referring to FIG. 4, case 1 shows an example of communication performed between ADN and IN. ADN may correspond to a M2M device having a constrained capability. In this case, since ADN does not include a CSE or a common service layer, ADN may communicate with a CSE of IN via Mca. In this case, since ADN does not include a CSE or a common service layer, ADN may not store data generated by an AE or an application layer of ADN and may not share the data with another entity. Hence, in the case 1, the data generated by the AE or the application layer of ADN may be stored and shared in the CSE of IN.

Case 2 shows an example of communication performed between ADN and MN. ADN may also correspond to a M2M device having a constrained capability. Hence, ADN may operate similarly to an operation of case 1 except that ADN is communicating with a CSE of MN. In particular, the ADN may communicate with the CSE of the MN via a Mca. And, since ADN does not include a CSE or a common service layer, ADN may not store data generated by an AE or an application layer of AND or share the data with another entity. Hence, the data generated by the AE or the application layer of ADN may be stored and shared in the CSE of IN.

Meanwhile, in case 2, MN may communicate with IN via MN. In this case, MN and MN may communicate with each other and MN and IN may communicate with each other via Mcc. MN may communicate with IN without passing through MN.

Case 3 shows an example of communication performed between ASN and MN. Unlike case 1 or case 2, since ASN includes a CSE or a common service layer, data generated by an AE or an application layer of ASN may be stored in the CSE or the common service layer of ASN. And, the AE of ASN may communicate with a CSE of MN via the CSE of ASN.

Case 4 shows an example of communication performed between ASN and MN. Compared to case 3, a CSE of ASN may directly communicate with a CSE of IN without passing through a MN.

IN or may be located in an infrastructure domain or a network domain and may include one CSE and zero or more AE. INs may communicate with each other via Mcc.

Figure 5:
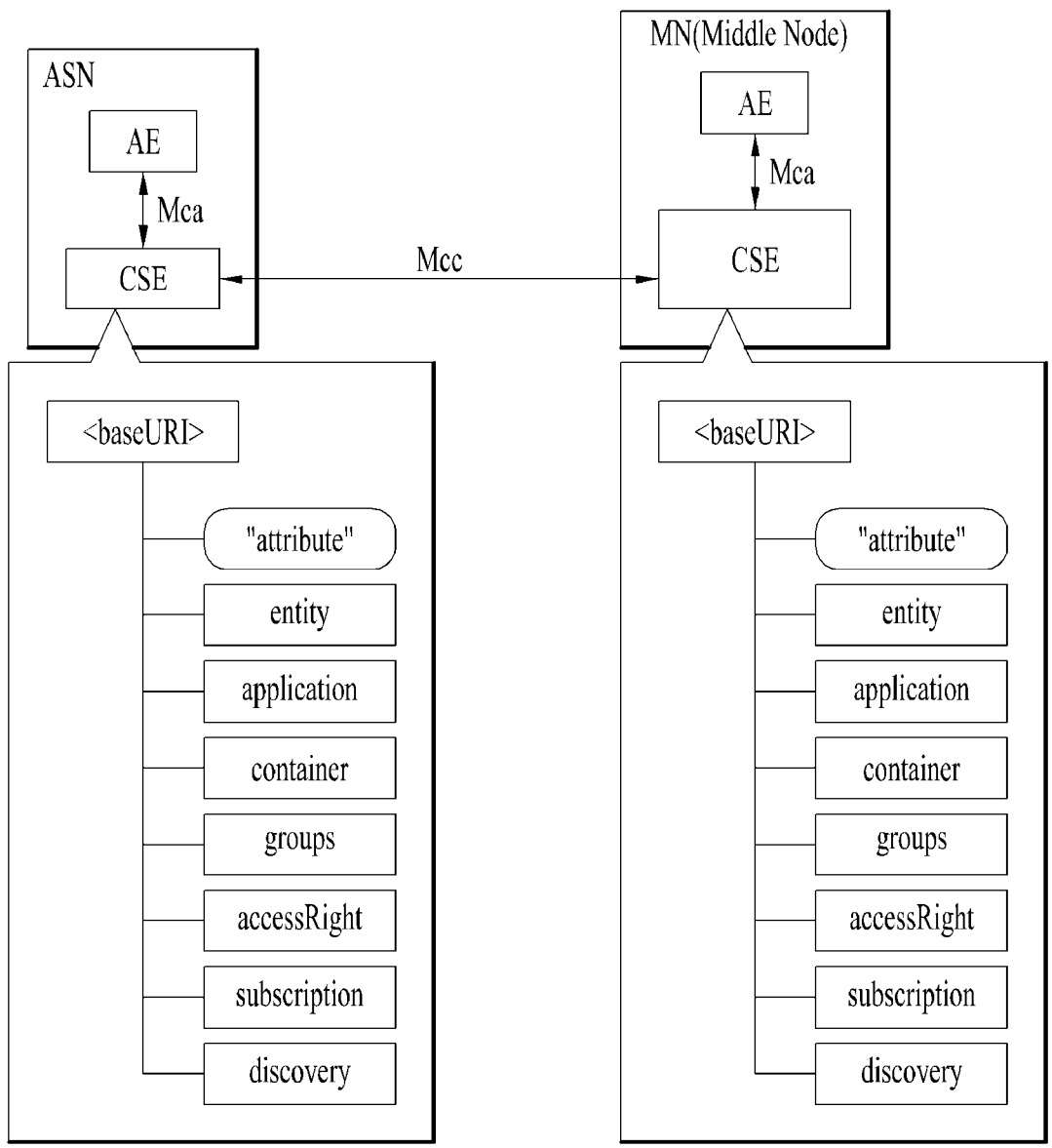
FIG. 5 illustrates an example of a resource used in a M2M system.

FIG. 5 illustrates an example of a resource used in a M2M system.

In a M2M system, an application entity (AE), a CSE, data and the like may be represented as a resource. In a M2M system, a data structure that can be uniquely addressed using a unique address (e.g., URI (universal resource identifier or uniform resource identifier)) is referred to as a resource. For example, URI indicates address information including protocol information such as HTTP/COAP, etc. In a M2M system, a resource may be represented as a specific data structure, and resources may be logically connected with each other. A resource may be managed by and stored in a common service layer. Hence, a M2M device, a M2M gateway, a CSE or a common service layer of a M2M server may include a resource. On the contrary, an AE or application layer of the M2M system may not have a resource. A resource may have a child resource and an attribute, and the child resource and attribute are also uniquely addressable. A root resource of a M2M resource may have an attribute and a child resource. For example, a type of the root resource may be denoted by <baseURI> or <CSEBase>. A resource type may be denoted by "<" and ">".

Various resources are defined in a M2M system. M2M applications may perform communication based on a resource which is an instantiation of a resource type. For example, a resource may be used for a M2M service such as registration of an application, reading a sensor value and the like. When an instance of a corresponding resource type is created, unique address information (e.g., URI) is given to each resource. Similar to a root resource, each resource may include an attribute and a child resource, and may be addressed using unique address information. A specific resource type defines a child resource and an attribute which a resource may have when instantiation. When an instantiation of a specific resource is performed, a resource may have an attribute and a child resource defined by a resource type of the specific resource.

An attribute stores information about a resource itself and may not include a child resource. A child resource may include an attribute and a child resource of its own. For example, a child resource may be a remote CSE resource, an application entity resource, an access control resource, a container resource, a group resource, a subscription resource, and the like.

Remote CSE resource: includes information of another CSE registered (connected) to a corresponding CSE. For example, a type of the remote CSE resource may be denoted by <entity> or <remoteCSE>.

Application entity resource: a resource located under an application entity resource (e.g. <baseURI>/<application> or <CSEBase>/<AE>) of a root resource or a remote CSE resource (e.g. <baseURI>/<entity> or <CSEBase>/<remoteCSE> of a root resource. If an application entity resource is located under an application entity resource (e.g. <baseURI>/<application> or <CSEBase>/<AE>) of a root resource, the application entity resource stores information of an application entity registered (or connected) to a corresponding CSE. If an application entity resource is located under a remote CSE resource (e.g. <baseURI>/<entity> or <CSEBase>/<remoteCSE> of a root resource, the application entity resource stores information of an application entity registered to a specific remote CSE. For example, a type of an application entity resource may be denoted by <application> or <AE>.

Access control resource: a resource storing information related to access rights. Authorization may be performed using access right information included in the access control resource.

Container resource: stores data per CSE or AE. For example, a container resource may be denoted by <container>.

Group resource: enables a function of grouping several resources into a group and processing as one group. For example, a type of a group resource may be denoted by <group>.

Subscription resource: performs a function of notifying a status change of a subscription target resource via a notification. For example, a type of a subscription resource may be denoted by <subscription>.

Figure 6:
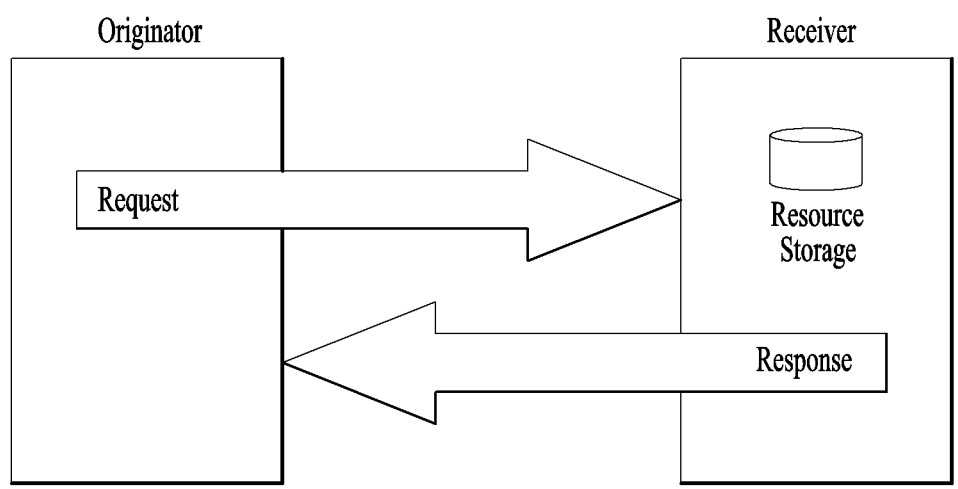
FIG. 6 illustrates an exemplary communication flow of a general M2M system.

FIG. 6 shows an example of a communication flow in a general M2M system. In general, an operation of an M2M system is performed based on data exchange. For example, a specific device can deliver a command to another device in the form of data to terminate an operation of the another device. In order to store data in a device, a specific-type data structure is used. The data structure may be referred to as a resource. A resource can be accessed using a unique address (e.g., URI).

Referring to FIG. 6, a request and response scheme is used in a connection between an AE and a CSE or a connection between CSEs. An originator may transmit a request message to a receiver to make a request for a stored resource and may receive a response message in response to the request message. Similarly, the receiver may receive a message for requesting a resource from the originator and may transmit a response message to the originator in response to the message. In the present specification, the request message can be abbreviated as a request and the response message can be abbreviated as a response. The request message transmitted to the receiver from the originator can include information described in the following.

op: a type of an executed operation. The op may correspond to one of creation (Create), retrieval (Retrieve), update (Update), deletion (Delete) or notification (Notify). In the present specification, information corresponding to an operation may be referred to as a command. If the op is set to the creation, the op may be referred to as a create request message (a create message or a create request). If the op is set to the retrieval, the op may be referred to as a retrieve request message (a retrieve message or a retrieve request). If the op is set to the update, the op may be referred to as an update request message (an update message or an update request). If the op is set to the deletion, the op may be referred to as a delete request message (a delete message or a delete request). If the op is set to the notification, the op may be referred to as a notify request message (a notify message or a notify request).

to: address information (e.g., URI (uniform resource identifier)) of a resource which is a target of an operation.

fr: identification information (or ID) of an originator which has generated a request. The fr can be used for a receiver to check the identification information of the originator for access privilege verification. The identification information of the originator can include address information (e.g., URI) of the originator.

cn: resource contents delivered through a request message.

rt: response message type. The rt indicates what type of a response is transmitted to a request originator and when the response is transmitted to the request originator. For example, the response message type may indicate one of a synchronous non-blocking request, an asynchronous non-blocking request, or a blocking request.

If a response message type indicates a synchronous non-blocking request (e.g., rt=nonBlockingRequestSynch), a request receiver may receive a corresponding request and may then transmit, to a requester, a response message including acknowledgement for confirming to process the request. The request receiver may include a reference, which may be used for accessing a status of the request and a result of a requested operation, in the response message. Regarding the synchronous non-blocking request, it shall be explained in more detail later with reference to FIG. 9 and FIG. 10.

If a response message type indicates an asynchronous non-blocking request (e.g., rt=nonBlockingRequestAsynch), a request receiver may receive a corresponding request and may then transmit, to a requester, a response message including acknowledgement for confirming to process the request. In this case, a list of notification targets may be included in a request message as an option. If the list of notification targets is included in the request message, a result of a requested operation may be transmitted in a manner of being included in a notification message transmitted to the notification targets. If the list of the notification targets is not included in the request message, a result of a requested operation may be transmitted to a request originator. Regarding the asynchronous non-blocking request, it shall be explained in more detail later with reference to FIG. 11.

If a response message type indicates a blocking request (e.g., rt=blockingRequest), a request receiver completes an operation requested by a corresponding request and may then transmit a response message along with a result of the requested operation. Regarding the blocking request, it shall be explained in more detail with reference to FIG. 7 and FIG. 8.

A receiver of a request message may transmit a response message to an originator of the request message after a requested operation (e.g., operation set to op) is performed by the receiver. The response message may include information described in the following. The response message may include at least one of the informations described in the following or may include a result value (rs) and a request identifier (ri) only.

rs: corresponds to a response code. The rs indicates whether or not a requested operation is successfully performed. For example, the response code may indicate one of a success, a non-success, or an acknowledgement. If the response code indicates the success (e.g., rs=successful), it indicates that a requested operation is successfully executed by a receiver (or a hosting entity). If the response code indicates the non-success (e.g., rs=unsuccessful), it indicates that a requested operation is not successfully executed by a receiver (or a hosting entity). If the response code indicates the acknowledgement (e.g., rs=acknowledgement), it indicates that a receiver directly received a request from a request originator, accepted the request and have not executed a requested operation yet. In this case, information on whether execution of the requested operation is successful or failed may be transmitted later.

ri: corresponds to a request identifier. The ri matches up with a request identifier of a request corresponding to a response message.

to: corresponds to identification information (or ID) of an originator which has generated a request.

fr: corresponds to identification information (or ID) of a receiver receiving a request.

cn: corresponds to resource contents delivered through a response message.

In the present specification, an originator corresponds to an originator device or an originator entity (or a CSE or an AE in the originator entity) and a receiver corresponds to a receiver device or a receiver entity (or a CSE or an AE in the receiver entity). A device (or a CSE in the device) including a target resource of a requested operation may be referred to as a hosting device or a hosting entity (or a hosting CSE). A receiver not the hosting device or the hosting entity may be referred to as a transit device or an entity (or a CSE in the entity). The transit device or the entity may perform a role in relaying a received message in the middle and delivering the message to the receiver device. A device or an entity to which another device (or a CSE or an AE in the another device) is registered may be referred to as a registrar device or an entity.

Figure 7:
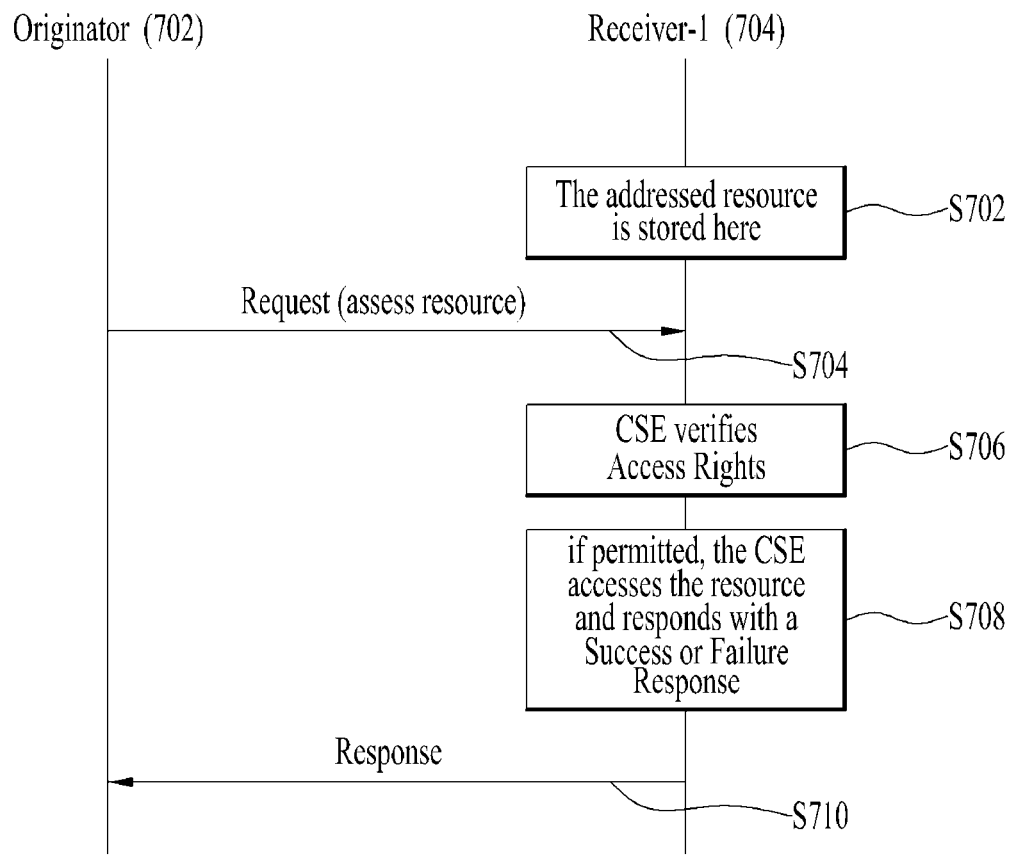
FIG. 7 and FIG. 8 show examples of procedures for accessing a resource based on a blocking request.
Figure 8:
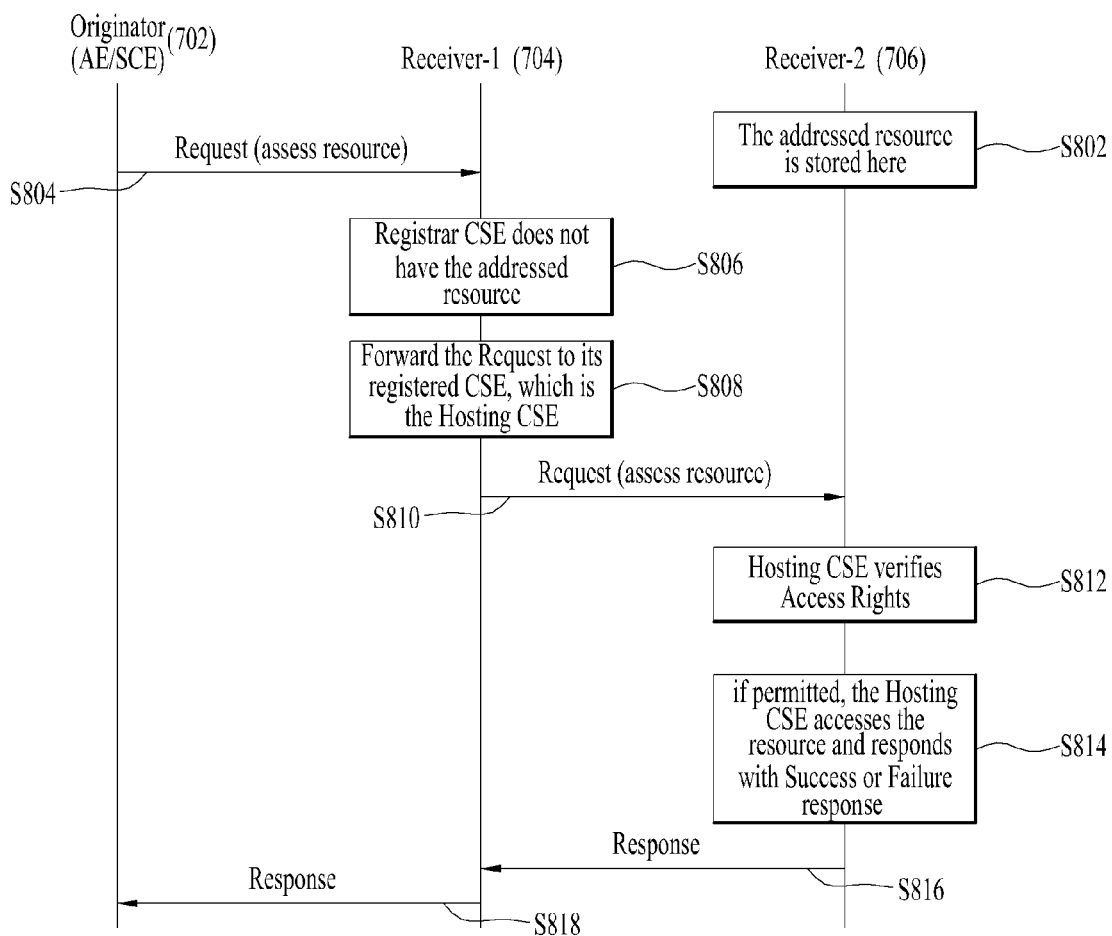

FIG. 7 and FIG. 8 show examples of procedures for accessing a resource based on a blocking request. A blocking request corresponds to a case (e.g., rt=blockingRequest) that response message type information (e.g., rt) of a request message is configured to indicate a blocking request (refer to the description related to FIG. 6). In the present specification, an operation mode for accessing a resource based on a blocking request is referred to as a blocking mode. In FIG. 7 and FIG. 8, the term "hop" may indicate the number of transit entities delivering a request to a receiver (or a hosting entity) from an originator. For example, having received a message, a device or an entity may determine whether or not an addressed resource is stored in the device or the entity with reference to address information (e.g., to) of an operation target resource which is set in the request message. If the addressed resource does not exist in the device, the device may deliver the message to a next entity or a device. In this case, the device or the entity receiving and delivering the message corresponds to a transit device or an entity and a hop increases by 1. And, in case of a blocking request, a receiver executes a requested operation and may then transmit a response message along with a result of the requested operation. Hence, it is assumed that a request originator is able to wait a sufficient length of time until a response is received in response to a request after the requested operation is completed. From the perspective of the request originator, it indicates that it is difficult to know time taken until receiving a response in response to a pending request or indicates that the time is potentially long.

Referring to FIG. 7, it shows a procedure for accessing a resource when there is no hop (no hop, hop=0). In an example of FIG. 7, assume that an originator 702 is registered to a receiver-1 704. Hence, the receiver-1 704 may correspond to a registrar entity or device. And, assume that the receiver-1 704 stores an addressed resource in the receiver-1 [S702]. Hence, the receiver-1 704 may correspond to a hosting entity or device. If there is no hop, the registrar entity (or a CSE) may correspond to an entity identical to the hosting entity (or a CSE).

In the example of FIG. 7, the request originator 702 may transmit a request to access a resource of the receiver-1 704 [S704]. For example, the request may be generated and transmitted by an application entity (or an application layer) or a CSE (or a common service layer). Having received the request, the receiver-1 704 may verify whether or not the originator 702 has access rights for the addressed resource [S706]. For example, the step S706 may be performed by the CSE of the receiver-1 704. After the access rights are verified, if an access to the resource is permitted, the receiver-1 704 may access the resource and may then generate a response message with a success response or a failure response [S708]. Subsequently, the receiver-1 704 may transmit the response message to the originator 702 [S710].

Referring to FIG. 8, it shows an example of a procedure for accessing a resource when a hop is 1 (hop=1). In the example of FIG. 8, assume that an originator 702 is registered to a receiver-1 704. Hence, the receiver-1 704 may correspond to a registrar entity or device. And, assume that a receiver-2 706 stores an addressed resource in the receiver-2 [S802]. Hence, the receiver-2 706 may correspond to a hosting entity or device. If a hop corresponds to 1, the registrar entity (or a CSE) corresponds to a transit entity and the registrar entity may correspond to an entity different from the hosting entity.

In the example of FIG. 8, the request originator 702 may transmit a request to the receiver-1 704 to access a resource of the receiver-2 706 [S804]. For example, the request may be generated and transmitted by an application entity (or an application layer) or a CSE (or a common service layer). Since the receiver-1 704 does not have an addressed resource [S806], the receiver-1 may deliver the received request to a hosting entity including the addressed resource among entities to which the receiver-1 is registered [S808]. In the example of FIG. 8, since the receiver-2 706 corresponds to the hosting entity, the receiver-1 704 may access a resource by transmitting the request to the receiver-2 706 [S810]. Having received the request, the receiver-2 706 may verify whether or not the receiver-2 has access rights for the addressed resource [S812]. After the access rights are verified, if an access to the resource is permitted, the receiver-2 706 may access the resource and may then generate a response message with a success response or a failure response [S814]. Subsequently, the receiver-2 706 may transmit the response message to the receiver-1 704 [S816] and the receiver-1 704 may deliver the response message to the originator 702.

The example of FIG. 8 may be applied to a case of multiple hops (hop greater than 1) in a same/similar manner. In case of multiple hops, the receiver-2 706 may not have an addressed resource and the receiver-2 may correspond to a transit entity or device. Hence, the receiver-2 706 may deliver a request to another device or entity to which the receiver-2 is registered. If there is a hosting entity among entities to which the receiver-2 is registered, the receiver-2 706 may transmit the request to the hosting entity. Yet, if the receiver-2 is not registered to the hosting entity, the receiver-2 706 may deliver the request to still another entity to which the receiver-2 is registered. In this case, if the receiver-2 706 is registered to IN (or IN-CSE), the receiver-2 may transmit the request to the IN (or IN-CSE). If the request is arrived at the hosting entity, the hosting entity may verify whether or not the hosting entity has access rights for the addressed resource. After the access rights are verified, if an access to the resource is permitted, the hosting entity may access the resource and may then generate/transmit a response message with a success response or a failure response. The response message may be delivered to the originator 702 in reverse order of an order of delivering the request message.

Meanwhile, if a request originator requested an acknowledgement of a request and a reference for a result of a requested operation as a response (e.g., synchronous non-blocking request or asynchronous non-blocking request), it is necessary for a request receiver to immediately provide a response to the request originator together with a reference for an internal resource on a registrar entity or a reference for another resource to make the request originator retrieve the result of the requested operation later. The reference may be provided in a response message in response to a request. A request may be classified into a synchronous non-blocking request and an asynchronous non-blocking request according to a scheme of making the request originator retrieve the result of the requested operation. The synchronous non-blocking request corresponds to a case that response message type information (e.g., rt) of a request message is configured to indicate the synchronous non-blocking request (e.g., rt=nonBlockingRequestSynch). The asynchronous non-blocking request corresponds to a case that response message type information (e.g., rt) of a request message is configured to indicate the asynchronous non-blocking request (e.g., rt=nonBlockingRequestAsynch). In the present specification, an operation mode for accessing a resource based on the synchronous non-blocking request is referred to as a synchronous non-blocking mode and an operation mode for accessing a resource based on the asynchronous non-blocking request is referred to as an asynchronous non-blocking mode. The synchronous non-blocking mode and the asynchronous non-blocking mode are commonly referred to as a non-blocking mode.

Figure 9:
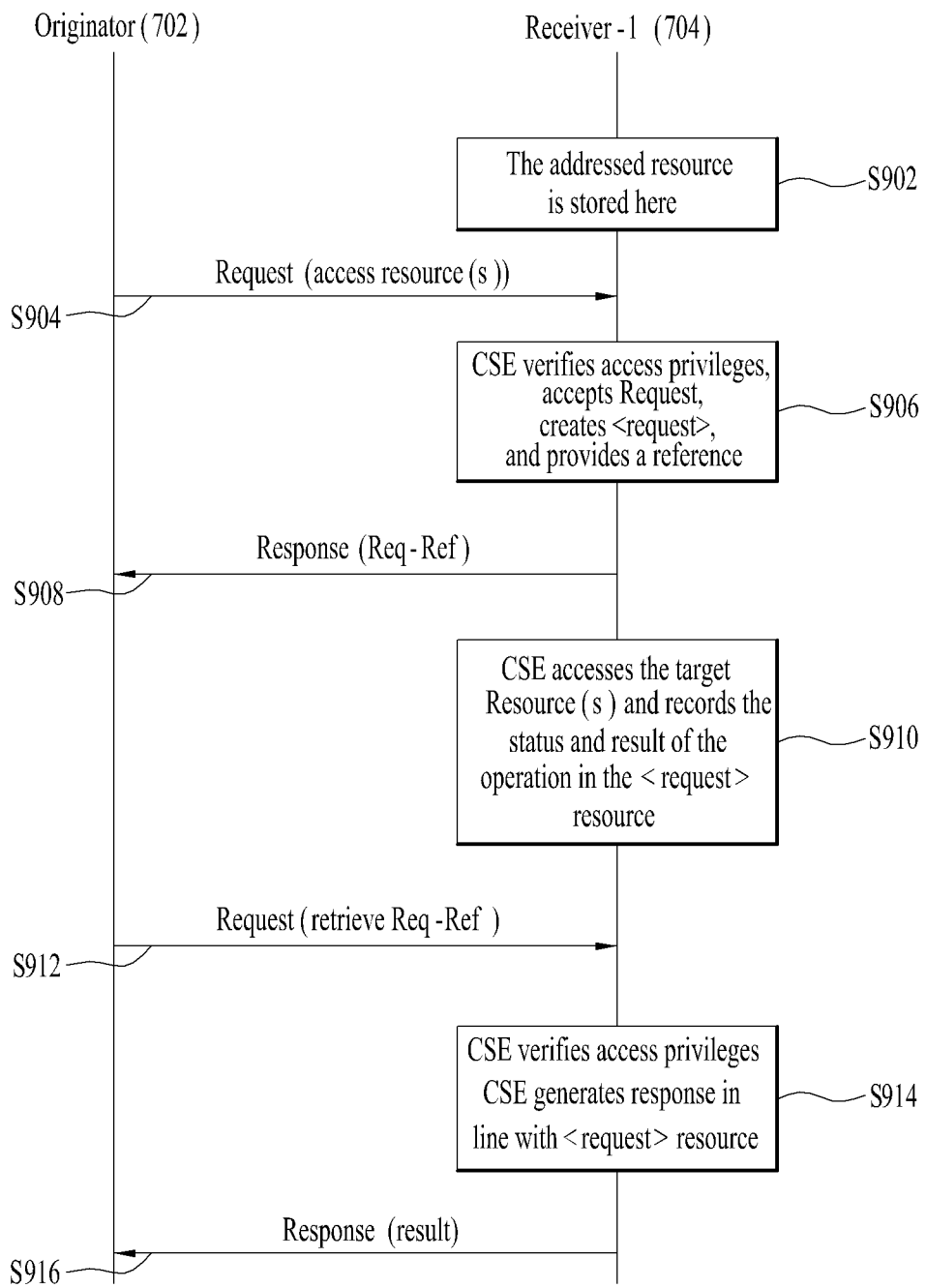
FIG. 9 and FIG. 10 show examples of a procedure for accessing a resource based on a synchronous non-blocking request.
Figure 10:
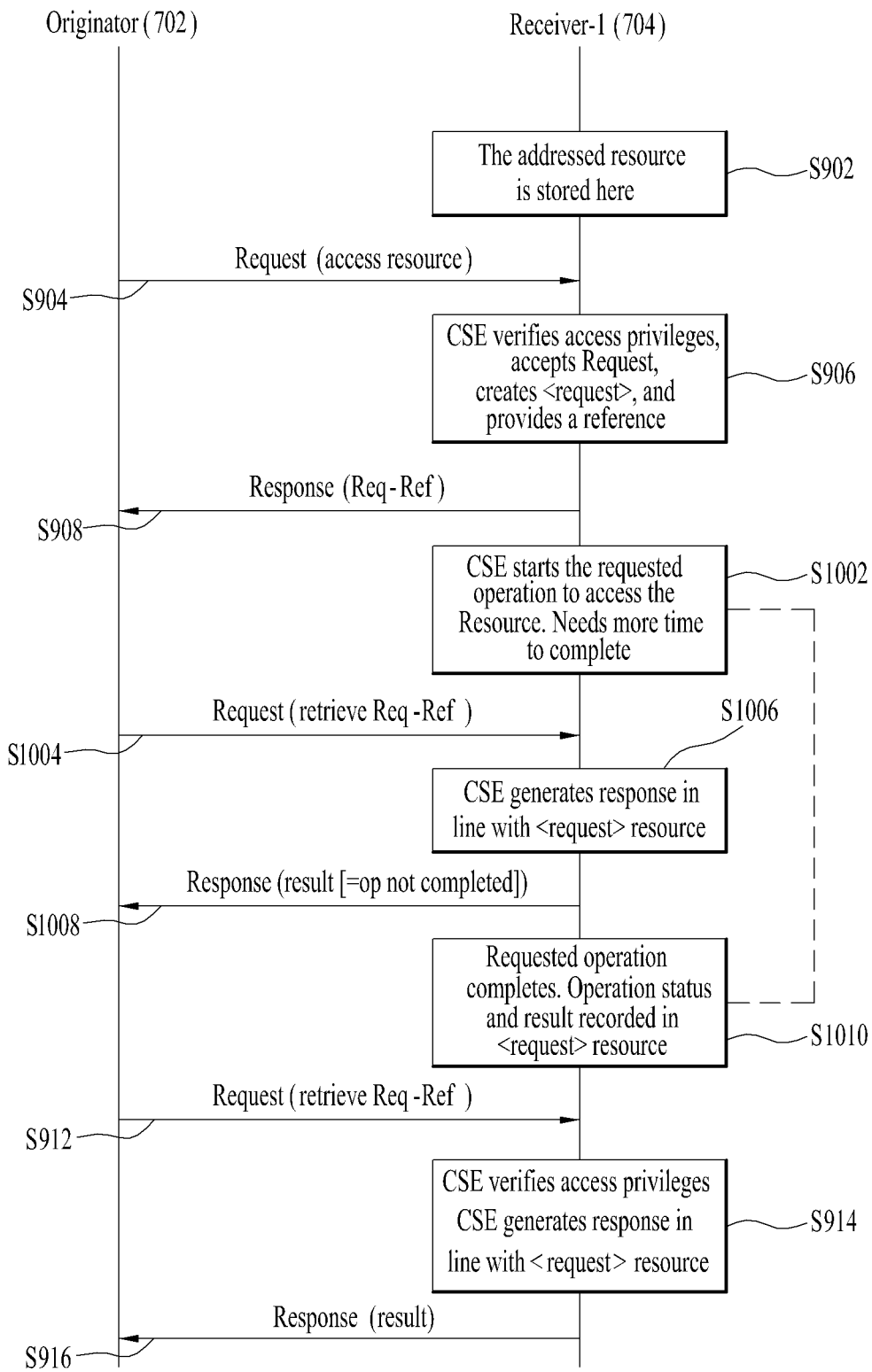

FIG. 9 and FIG. 10 show examples of a procedure for accessing a resource based on a synchronous non-blocking request. In the examples of FIG. 9 and FIG. 10, assume that a receiver-1 704 has an addressed resource [S902]. Hence, in the examples, the receiver-1 704 may correspond to a registrar entity and a hosting entity.

In case of the synchronous non-blocking request, assume that a request originator is unable to receive an asynchronous message. Hence, in case of the synchronous non-blocking request, it is necessary for the originator to initiate all information exchange between the originator and a registrar entity. And, in case of the synchronous non-blocking request, the request originator retrieves a result of a requested operation using a reference. In this case, unlike the examples shown in FIG. 9 and FIG. 10, an information flow may vary according to timing of retrieving the result of the requested operation.

Referring to FIG. 9, assume that a receiver completes the requested operation before the originator retrieves the result of the requested operation. Specifically, the originator 702 may transmit a request for accessing a resource to the receiver-1 704 [S904]. The receiver-1 704 verifies access privilege, accepts the request, generates a resource (e.g., <request> resource) for storing the result of the requested operation, and may provide a reference (e.g., Req-Ref) for the resource [S906]. The receiver-1 704 may transmit the reference to the originator in a manner of including the reference in a response message [S908]. Subsequently, the receiver-1 704 accesses an operation target resource, executes an operation and may then record a status of the operation and a result of the operation on the resource (e.g., <request> resource) created in the step S906. The originator 702 may transmit a request message to the receiver-1 704 to retrieve the reference received in the step S908 [S912]. The receiver-1 704 may verify access privilege and generate a response message in a manner of including contents of the resource (e.g., <request> resource) on which the operation result is recorded [S914]. The receiver-1 704 may transmit the response message including the operation result to the originator 702 [S916].

Referring to FIG. 10, the receiver may complete a requested operation after the originator transmits a request for retrieving a result of the requested operation. Specifically, since the step S902 to the step S908 are the same as described above with reference to FIG. 9, the description about FIG. 9 is incorporated herein by reference. In the step S1002, although the receiver-1 704 initiates the requested operation by accessing an operation target resource, it may be necessary to have more time to complete the requested operation. The originator 702 may transmit a request message to the receiver-1 704 to retrieve a result of the requested operation before the operation is completed [S1004]. The receiver-1 704 may generate a response message according to the resource (e.g., <request> resource) created in the step S906 [S1006]. In this case, since the receiver-1 704 is in a state that the requested operation is not completed yet, a result may indicate that the requested operation is not completed yet. The receiver-1 704 may transmit the response message including the result (e.g., op not completed) to the originator 702 [S1008]. In the step S1010, the receiver-1 704 may complete the requested operation and may record an operation status and a result on the resource (e.g., <request> resource) created in the step S906. The originator may retrieve the operation result using the same scheme as described above with reference to FIG. 9 [S912 to S916].

Figure 11:
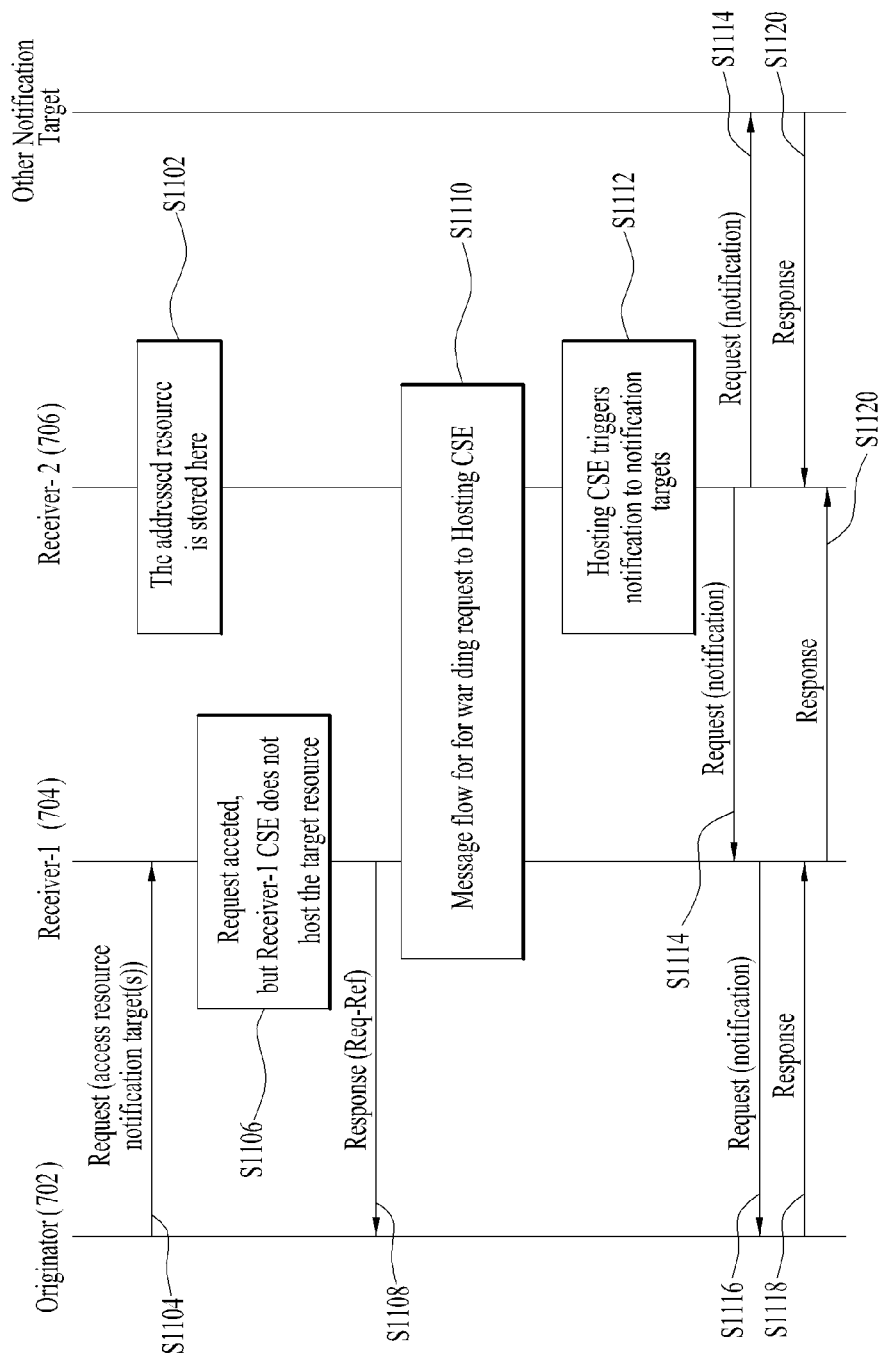
FIG. 11 shows an example of a procedure for accessing a resource based on an asynchronous non-blocking request.

FIG. 11 shows an example of a procedure for accessing a resource based on an asynchronous non-blocking request. In the example of FIG. 11, assume that a receiver-1 704 does not have an addressed resource and a receiver-2 706 has an addressed resource [S1102]. Hence, in the example, the receiver-1 704 may correspond to a registrar entity and the receiver-2 706 may correspond to a hosting entity.

In case of the asynchronous non-blocking request, a request originator or another entity which needs to know a request result may receive a notification message. An entity performing a requested operation may transmit a message to the originator or another indicated entities at arbitrary time to transmit a status and a result of the requested operation to one or more notification targets. In this case, the transmitted notification message may operate using a scheme identical to a scheme for a notification message which is transmitted after subscription for a resource is triggered. And, in case of the asynchronous non-blocking request, if a receiver (e.g., the receiver-1 704) does not support a resource type (e.g., <request> resource) on which an operation result is to be recorded, the receiver may respond to the request using an acknowledgement without a reference for a corresponding resource.

Referring to FIG. 11, the originator 702 may transmit a request message indicating two notification targets to the receiver-1 704 [1104]. Hence, if a result of a requested operation is available or a request is failed, a notification message may be transmitted to a notification target 708 other than the originator 702. Although the receiver-1 704 accepts a request, the receiver-1 does not have a target resource of the requested operation [S1106]. Hence, the receiver-1 704 may transmit a response message including a reference (e.g., Req-Ref) for a resource (e.g., <request> resource) on which a result of the requested operation to be recorded to the originator 702 [S1108]. In the step S1108, if the receiver-1 704 does not support the <request> resource type, reference information may not be included in the response message. In the step S1110, the receiver-1 704 and the receiver-2 706 may perform a message flow to deliver a request to a hosting entity. In the example of FIG. 11, since the receiver-2 706 corresponds to the hosting entity, the receiver-2 may trigger a notification message to be transmitted to notification targets [S1112]. The receiver-2 706 may transmit the notification message to a notification target 708 other than the receiver-1 704 [S1114] and the receiver-1 704 may transmit the notification message to the originator 702 [S1116]. The originator 702 may transmit a response message to the receiver-1 704 in response to the received notification message [S1118] and each of the receiver-1 704 and the notification target 708 other than the receiver-1 704 may transmit a response message to the receiver-2 706 [S1120].

Figure 12:
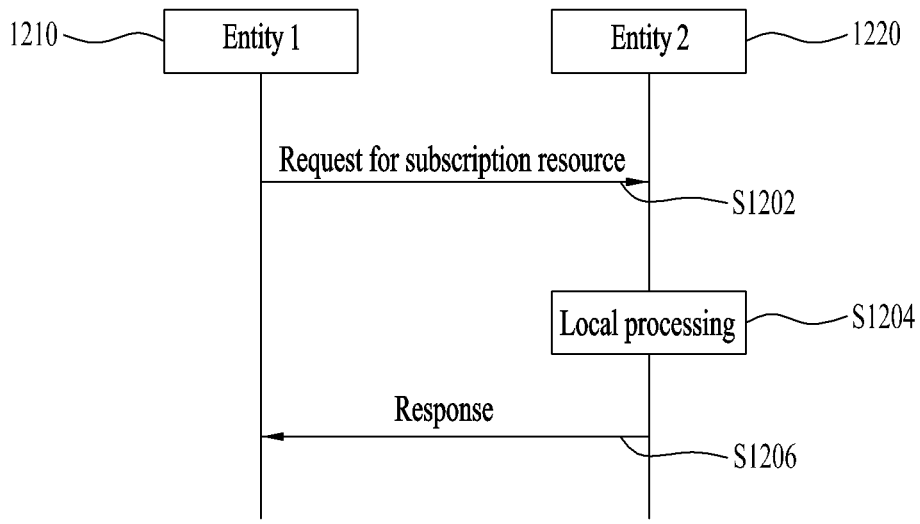
FIG. 12 illustrates an example of a procedure related to a subscription resource.

FIG. 12 illustrates an example of a procedure related to a subscription resource.

In a M2M system (e.g., one M2M), as a resource changes, an entity interested in the change of the resource may subscribe to a notification of the change. In this case, in order to subscribe to the notification, a resource for subscription should be configured. The resource for subscription may be referred to as a subscription resource or a <subscription> resource. When a subscription resource is created/configured, if a modification/change satisfying a condition configured in the subscription resource occurs in a subscription target resource (also referred to as a subscribed-to resource or a subscribed resource), a device (or an entity) in which the subscription resource is configured may transmit a notification to an address (e.g. notification URI or contact attribute) configured in the subscription resource. The address information (e.g. notification URI or contact attribute) configured in the subscription resource may be used as identification information of a notification target. A device (or an entity) in which a subscription resource is configured and/or which includes a subscription target resource is referred to as a hosting device (or a hosting entity). For example, a subscription target resource may exist in a CSE of a M2M gateway. In this case, the M2M gateway is referred to as a hosting device and the CSE of the M2M gateway is referred to as a hosting CSE.

A subscription procedure may be performed using a subscription resource in a resource-oriented manner. For example, a subscription resource may be created to subscribe to a specific subscription target resource, a condition for subscription may be changed by modifying a subscription resource, and a subscription resource may be deleted when subscription is not needed anymore.

A subscription resource includes information about a subscription target resource (or subscribed-to resource). A relation between the subscription target resource and the subscription resource may be represented as a parent-child relation. For example, a <container> resource including a subscription target resource may have a <subscription> resource as a child resource. When a parent subscription target resource is deleted, the <subscription> resource may be deleted.

If a subscription resource corresponds to a child resource, a notification for indicating a status change of a parent resource may be delivered to an entity specified in address information (e.g. a notificationURI or contact attribute) in the subscription resource according to configuration (or attribute configuration) of the subscription resource. If an originator has a RETRIEVE (or READ) permission for a subscribable resource, the originator may create a subscription resource. A resource subscriber may be an originator of a subscription request or another entity. If a modification to a subscription target resource occurs, it is able to determine whether to transmit a notification to the resource subscriber by comparing the modification and a specific attribute (e.g., notificationCriteria attribute) with each other.

A subscription resource (e.g., <subscription> resource) may have various attributes and child resources. For example, the subscription resource (e.g., <subscription> resource) may have attributes shown in Table 1. In Table 1, R/W indicates read/write permission, and may correspond to one of READ/WRITE (RW), READ ONLY (RO), or WRITE ONLY or WRITE ONCE (WO). Table 1 is just an example. An attribute of a subscription resource may be configured in a manner of being different from Table 1.

TABLE 1

| Attribute Name | R/W | Description |
| --- | --- | --- |
| resourceType | WO | Resource Type. |
| resourceID | WO | This attribute is an identifier for resource that is used for 'non-hierarchical URI method' or 'IDs based method' cases. |
| parentID | RO | The system shall assign the value to this attribute according to the parameters given in the CREATE Request. |

TABLE 1-continued

| Attribute Name | R/W | Description |
|---|---|---|
| expirationTime | RW | Time/date after which the resource will be deleted by the hosting CSE. This attribute can be provided by the issuer, and in such a case it will be regarded as a hint to the hosting CSE on the lifetime of the resource. |
| creationTime | RO | Time/date of creation of the resource. |
| lastModifiedTime | RO | Last modification time/date of the resource. |
| accessControlPolicyIDs | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |
| notificationCriteria | RW | When notification events happen on the subscribed-to resource, the list of notification events that match the notification criteria shall be sent as a Notify request. |
| expirationCounter | RW | When the number of notifications becomes the same as this counter, the <subscription> resource shall be deleted. |
| notificationURI | RW | List of URI(s) where the resource subscriber will receive notifications. This list of URI(s) may not represent the resource subscriber entity. |
| aggregationURI | RW | URI to aggregate notifications from group members of a <group> resource. |
| batchNotify | RW | Indicates that notifications should be batched for delivery. When set, notification events are temporarily stored until either a specified number is ready to send or until a duration after the first notification event has expired. |
| rateLimit | RW | Indicates that notifications should be rate-limited. When set, notification events that exceed a specified number within a specified time are temporarily stored then sent when the number of events sent per specified time falls below the limit. |
| priorSubscriptionNotify | WO | Indicates that when this subscription is created, whether notification events prior to subscription should be sent, e.g. send prior "n" notifications, if available. |
| notificationStoragePriority | RW | Indicates a priority for this subscription relative to other subscriptions belonging to this same subscriber for retention of notification events when storage is congested. |
| notificationStructure | RW | Type of information that shall be contained in notifications. E.g., modified attribute only of a subscribed-to resource, a whole subscribed-to resource, and/or URI of a corresponding <subscription> resource. |
| subscriberURI | WO | URI that the <subscription> created entity can get notification from the <subscription> hosting CSE. <subscription> deletion shall be notified if this URI is provided. |

In an example of Table 1, a filtering attribute (e.g., notificationCriteria) corresponds to a list of conditions for modification/change of a subscription target resource, and each of the conditions may be in a logical AND relation. For example, when the filtering attribute (e.g., notificationCriteria) includes two conditions, if modification/change of a subscription target resource satisfies all of the two conditions, a notification may be transmitted. An amount of a notification message may be adjusted by configuring a filtering attribute to a subscription resource. If a notification is configured to be transmitted to a notification target entity only when the configured filtering attribute is satisfied, the problem of excessive notification messages may be prevented. Table 2 shows an example of conditions that may be included in the filtering attribute.

TABLE 2

| Condition tag | Matching condition |
|---|---|
| createdBefore | The creationTime attribute of the subscribed resource is chronologically before the specified value. |
| createdAfter | The creationTime attribute of the subscribed resource is chronologically after the specified value. |
| modifiedSince | The lastModifiedTime attribute of the subscribed resource is chronologically after the specified value. |
| unmodifiedSince | The lastModifiedTime attribute of the subscribed resource is chronologically before the specified value. |
| stateTagSmaller | The stateTag attribute of the resource is smaller than the specified value. |
| stateTagBigger | The stateTag attribute of the resource is bigger than the specified value. |
| expireBefore | The expirationTime attribute of the subscribed resource is chronologically before the specified value. |
| expireAfter | The expirationTime attribute of the subscribed resource is chronologically after the specified value. |
| labels | The labels attributes of the subscribed resource matches the specified value. |

TABLE 2-continued

| Condition tag | Matching condition |
|---|---|
| resourceType | The resourceType attribute of the child resource of the subscribed-to resource is the same as the specified value. It allows notification of child resource creation and deletion. |
| sizeAbove | The contentSize attribute of the <contentInstance> resource is equal to or greater than the specified value. |
| sizeBelow | The contentSize attribute of the <contentInstance> resource is smaller than the specified value. |
| contentType | When the subscribed-to resource is changed by the operations or expiration, the resource status is the same as the specified value. Possible values are: child created, updated, child deleted, deleted. |
| operationMonitor | The operations accessing the subscribed-to resource matches with the specified value. It allows monitoring which operation is attempted to the subscribed-to resource regardless of whether the operation is performed. This feature is useful when to find malicious AEs. Possible string arguments are: create, retrieve, update, delete. |
| attribute | This is an attribute of resource types. Therefore, a real tag name is variable depends on its usage. E.g., creator of container resource type can be used as a filter criteria tag as "creator = Sam". |

Referring to FIG. 12, entity 1 1210 may perform a procedure shown in FIG. 12 to subscribe to a specific resource of entity 2 1220. Entity 1 1210 may or may not correspond to a target receiving a notification according to change of a subscription target resource. In an example of FIG. 12, the specific resource may correspond to the subscription target resource, and, since entity 2 1220 includes the subscription target resource, entity 2 1220 may correspond to a hosting device (or an entity).

In step S1202, entity 1 1210 may transmit a request for a subscription resource to entity 2 1220 to subscribe to a specific resource. For example, the request for subscription resource may correspond to one of a creation request of subscription resource, a retrieval request of subscription resource, a deletion request of subscription resource, or an update request of subscription resource. Each request may have a form of a request message according to the request-response scheme described with reference to FIG. 6. For example, if the request in step S1202 corresponds to a creation request, a request for a subscription resource may include op information including C (Create), cn information including attribute information (e.g., notificationURI, filter-Criteria, creator, and the like) of the subscription resource, fr information including identification information of entity 1 1210, and/or to information including identification information of a target resource. In another example, if the request in step S1202 corresponds to a deletion request or an update request, a request for a subscription resource may include all or a part of information described with reference to FIG. 6. In the present specification, a creation request for a subscription resource may be referred to as a subscription creation request, a retrieval request for a subscription resource may be referred to as a subscription retrieval request, a deletion request for a subscription resource may be referred to as a subscription deletion request, and an update request for a subscription resource may be referred to as a subscription update request. Requests related to a subscription resource may be commonly referred to as a subscription request.

In step S1204, entity 2 1220 validates whether a request for a subscription resource is capable of being processed, and process the request if the request is capable of being processed. For example, if device 2 920 receives a creation request, entity 2 1220 validates whether a subscription target resource designated in the to information is subscribable, whether an originator (e.g., entity 1) of the request has RETRIEVE permission for the subscription target resource. If the aforementioned conditions are all satisfied, entity 2 1220 may create a subscription resource under a subscription target resource (or a subscribed-to resource) designated by the to information.

In another example, if entity 2 1220 receives a deletion request, entity 2 1220 validates whether the originator (e.g., 1310) of the request has DELETE permission. If the aforementioned condition is satisfied, device 2 920 deletes a subscription resource.

In step S1206, entity 2 1220 may send a response message to entity 1 1210 after a request for a subscription resource is processed. The response message of step S1206 may have a form identical/similar to the response message described with reference to FIG. 6. And, in case of the retrieval request, the response message may include information to be returned.

Figure 13:
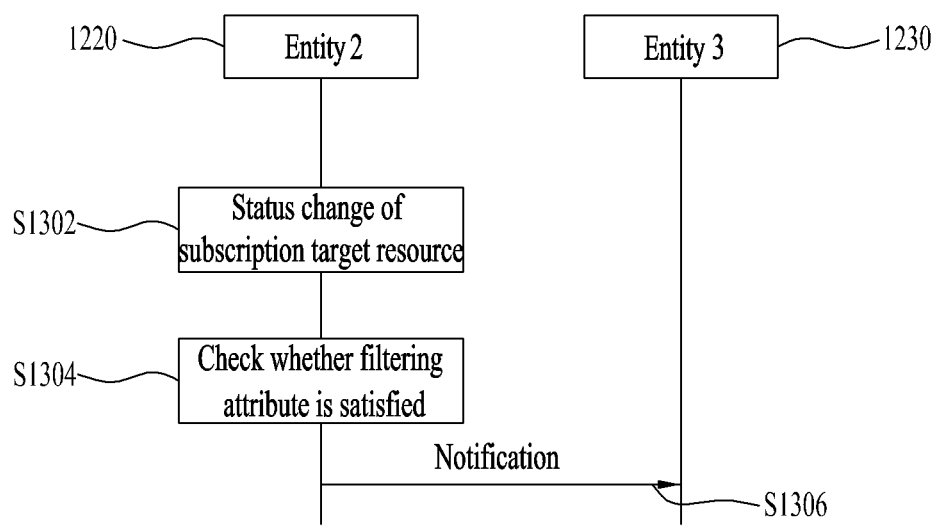
FIG. 13 illustrates an example of a notification procedure.

FIG. 13 illustrates an example of a notification procedure. In the procedure for notification, an originator may correspond to a device or an entity (e.g., entity 2) hosting a subscription resource. And, a receiver may correspond to a device (or an entity) indicated by address information (e.g., notificationURI) configured in the subscription resource. Specific policy information may be configured for the procedure for notification. The originator may be configured to send a notification message (e.g., NOTIFY) when the policy information is satisfied. A notification message may refer to a request message in which op is set to NOTIFY.

The notification message (e.g. NOTIFY) may be generated when a notification event (e.g. a status change of a subscription target resource). The notification event may be triggered by a subscription resource. For example, if change of a subscription target resource that includes the subscription resource as its child resource satisfies a filtering attribute (e.g. notificationCriteria) configured in the subscription resource, the notification message may be transmitted to a receiver indicated by the address information (e.g., notificationURI) configured in the subscription resource. The receiver of the notification message may or may not correspond to a device or an entity which has created/configured the subscription resource. For example, entity 1 1210 may be identical to entity 3 1230 or may be different from entity 3 1230. The notification message may include information described in the following.

fr: identification information or ID of originator (e.g., entity 2)

to: address information configured in subscription resource (e.g., notificationURI)

cn: data representing modified content of subscription target resource and/or subscription reference information (e.g., URI of the subscription resource) which has created the notification message and/or other additional information Referring to FIG. 13, in step S1302, originator (e.g. entity 2) may detect/sense a change of a subscription target resource. The subscription target resource corresponds to a parent resource of a subscription resource. If a resource or an attribute located at a same level as that of the subscription resource under the subscription target resource is modified/changed, originator (e.g. entity 2) (e.g., SUB CSF or CSE, refer to FIG. 3) may recognize it as a change of the subscription target resource. If a change of the subscription target resource is detected/sensed, a notification event may be generated.

If the change of the subscription target resource is detected, in step S1304, originator (e.g. entity 2) checks whether the change is matched with a specific attribute (e.g., notificationCriteria) configured in the subscription resource. For example, the specific attribute may include at least one attribute among the attributes shown in the example of Table 2. If the change of the subscription target resource does not satisfy any condition included in the filtering attribute, originator (e.g. entity 2) may ignore the change.

If the change of the subscription target resource satisfies all conditions included in the filtering attribute, in step S1306, originator (e.g. entity 2) may transmit a notification message to entity 3 (1230) indicated by address information (e.g., notificationURI) configured in the subscription resource. For example, the notification message in step S1306 may include identification information of originator (e.g. entity 2), data representing modified content of the subscription target resource, and/or subscription reference information which has created the notification message. If the change of the subscription target resource does not satisfy any of conditions included in the filtering attribute, originator (e.g. entity 2) may not transmit a generated notification message.

Figure 14:
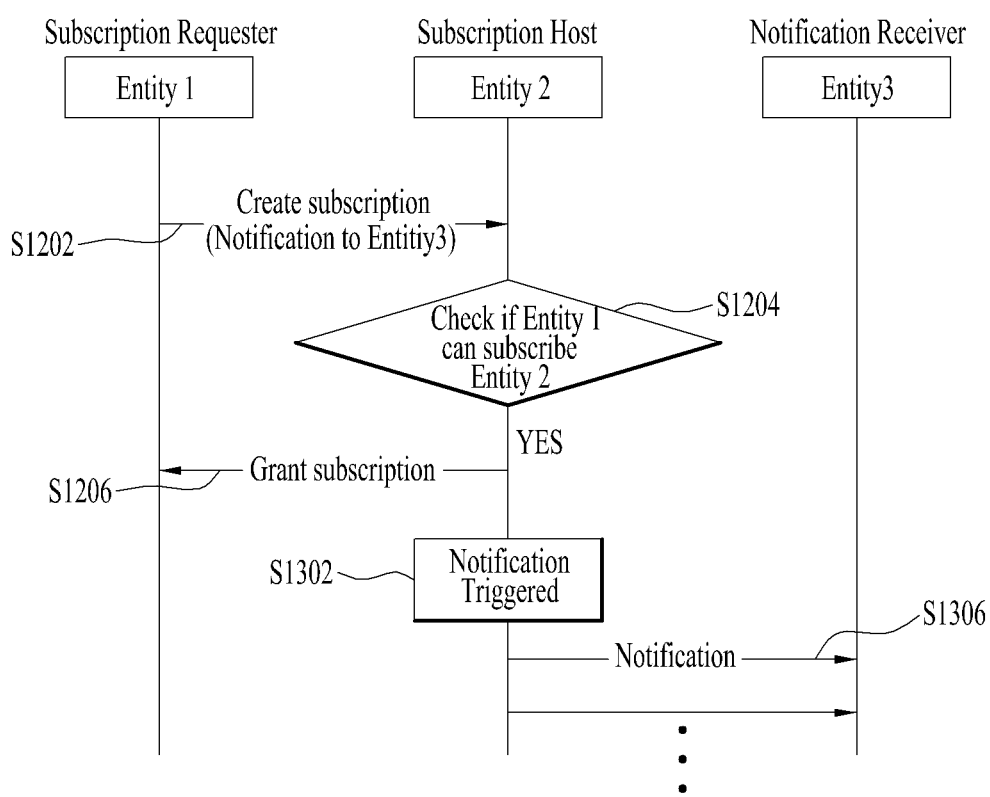
FIG. 14 shows an example of a problem related to a subscription-notification procedure.

FIG. 14 shows an example of a problem related to a subscription-notification procedure.

As described above, a request receiver (e.g., entity 2) may verify whether or not a request originator (e.g., entity 1) has a right (or access right) to a subscription resource or a subscription target resource in response to a subscription request. If the request originator (e.g., entity 1) does not have the right (or access right) to the subscription resource or the subscription target resource, the subscription request is rejected and a response message may include a failure result. Yet, although the verification is performed, there may exist a problem related to subscription verification. In the present specification, the subscription verification may be referred to as an operation of verifying the right (or access right) for the subscription request. And, in the present specification, a subscription requester may be referred to as a request originator and a subscription host may be referred to as a hosting entity.

Referring to FIG. 14, in the step S1202, the request originator (e.g., entity 1) may configure a subscription resource to the hosting entity (e.g., entity 2) such that a notification receiver (e.g., entity 3) is a subscriber. In this case, in the step S1204, the hosting entity (e.g., entity 2) may check whether or not the request originator (e.g., entity 1) has a right to the subscription target resource or the subscription resource. For example, the hosting entity (e.g., entity 2) may check whether or not the request originator (e.g., entity 1) has a RETRIEVE access right to a subscription target resource belonging to the hosting entity. If checking of the access right is successfully performed, in the step S1206, a response message for permitting a subscription request may be transmitted to the request originator (e.g., entity 1).

According to a conventional subscription/notification mechanism, if the request originator (e.g., entity 1) has an access right to the hosting entity (e.g., entity 2), it may be able to configure a subscription resource to transmit a notification message to a notification receiver (e.g., entity 3). In this case, if the request originator (e.g., entity 1) configures the subscription resource with a malicious intention, the notification receiver (e.g., entity 3) receives an unwanted notification message, thereby increasing load of the notification receiver (e.g., entity 3). In particular, if the request originator (e.g., entity 1) intends to perform a malicious attack such as DDoS attack, system load may increase not only in the notification receiver (e.g., entity 3) but also in the hosting entity (e.g., entity 2). As a result, entire system may be broken down.

And, although the request originator (entity 1) does not have a malicious intention, if the hosting entity (e.g., entity 2) has a right of sending a notification message to the notification receiver (e.g., entity 3), the hosting entity may be abused by a further different entity. For example, if it is assumed that the hosting entity (e.g., entity 2) has a right of sending a notification message to the notification receiver (e.g., entity 3), another entity (e.g., entity 4), which has an access right to the hosting entity (e.g., entity 2), may configure a separate subscription resource to the hosting entity (e.g., entity 2). In this case, since the hosting entity (e.g., entity 2) has the right of sending a notification message to the notification receiver (e.g., entity 3), a notification message generated by the subscription resource, which is configured by the entity 4, may be transmitted to the notification receiver (e.g., entity 3) by appropriating the access right of the hosting entity (e.g., entity 2) without permission. Hence, in this case, the hosting entity (e.g., entity 2) and the notification receiver (e.g., entity 3) may be exposed to a malicious attack.

In order to prevent the aforementioned problem from being occurred, the present invention proposes a privilege checking method for subscription and notification. The present invention proposes two additional privilege checking described in the following.

Whether or not a hosting device or entity (e.g., entity 2) has privilege (or access rights) capable of transmitting a notification to an entity or a device (e.g., entity 3) designated to address information (e.g., notificationURI) of a subscription resource.

Whether or not a request originator (e.g., entity 1) has privilege (or access rights) capable of configuring a subscription resource targeting a notification message receiver (e.g., entity 3) as a notification target. Or, whether or not the request originator (e.g., entity 1) has privilege (or access rights) capable of configuring a subscription resource by designating address information of a notification message receiver (e.g., entity 3) into address information (e.g., notificationURI) of the subscription resource. Or, whether or not the request originator (e.g., entity 1) has privilege (or access rights) capable of transmitting a notification to an entity or a device (e.g., entity 3) designated by address information (e.g., notificationURI) of a subscription resource.

The privilege checking method according to the present invention may be performed when a request originator (e.g., entity 1) and a notification receiver (e.g., entity 3) are different from each other. For example, the method may be performed when address information (e.g., notificationURI) of a subscription resource does not indicate the request originator (e.g., entity 1).

In the present specification, privilege capable of transmitting a notification or privilege capable of configuring a subscription resource may be represented as NOTIFY/SUBSCRIBE permission/privilege, and these privileges may be interchangeably used with each other. For example, privilege of a request originator (e.g., entity 1) capable of configuring a subscription resource targeting a notification receiver (e.g., entity 3) as a notification target and privilege of the request originator (e.g., entity 1) capable of transmitting a notification message to the notification receiver (e.g., entity 3) may be used as a same meaning. Or, for example, privilege of the request originator (e.g., entity 1) capable of configuring subscription for transmitting a notification to the notification receiver (e.g., entity 3) and privilege of the request originator (e.g., entity 1) capable of transmitting a notification message to the notification receiver (e.g., entity 3) may be used as a same meaning. The corresponding privilege may be configured before the request originator (e.g., entity 1) requests the hosting entity (e.g., entity 2) to create a subscription resource. Hence, the request originator (e.g., entity 1) may have sufficient privilege for the notification receiver (e.g., entity 3).

Subsequently, if the request originator (e.g., entity 1) configures the notification receiver (e.g., entity 3) as a notification target while requesting a subscription from the hosting entity (e.g., entity 2), the hosting entity (e.g., entity 2) may check privilege of the request originator (e.g., entity 1) and privilege of the hosting entity (e.g., entity 2) with respect to the notification receiver (e.g., entity 3). The hosting entity (e.g., entity 2) may grant a subscription request of the request originator (e.g., entity 1) only when the privilege checking according to the present invention is successful.

In the present specification, identification information of a device or an entity may include address information (e.g., URI) that indicates the device or the entity. Or, identification information of a device or an entity may include address information (e.g., URI) that indicates a resource included in the device or the entity.

Subscription verification according to the present invention may be performed when a hosting entity (e.g., entity 2) is able to check privilege of a notification target. For example, if it is unable to check the privilege of the notification target, verification is not performed. The privilege of the notification target may be checked in various ways. For example, a request originator (e.g., entity 1) may inform a hosting entity (e.g., entity 2) of information on the privilege of the notification target together with a subscription request. Or, although the request originator (e.g., entity 1) does not provide the hosting entity with the information on the privilege of the notification target, it may be able to perform a verification-related operation in a manner of determining whether or not the hosting entity (e.g., entity 2) is able to check the privilege of the notification target. As a different example, it is able to attempt a verification request and an actual operation irrespective of whether or not the hosting entity (e.g., entity 2) is able to check the privilege of the notification target. If it is able to check the privilege of the notification target, it is able to successfully perform verification and identify a result. On the contrary, if it is unable to check the privilege of the notification target, it is able to identify that verification is not successfully performed and is able to deliver a general error response or deliver no response.

Method 1 (Subscription Host Performs Verification)

In Method 1 according to the present invention, a procedure of verifying whether or not a hosting entity (e.g., entity 2) has an access right for transmitting a notification message to a notification receiver (e.g., entity 3) is added as compared to the conventional technology. If a request originator (e.g., entity 1) has no malicious intention and has an appropriate privilege for the notification receiver (e.g., entity 3), a privilege of the hosting entity (e.g., entity 2) capable of transmitting a notification to the notification receiver (e.g., entity 3) may be configured in advance before a subscription configuration is requested. Hence, having received a subscription request, the hosting entity (e.g., entity 2) checks whether or not the hosting entity has a right capable of transmitting a notification to the notification receiver (e.g., entity 3). If the hosting entity does not have the right, the hosting entity may consider that the request originator (e.g., entity 1) has no right for the notification receiver (e.g., entity 3) and the hosting entity may reject the subscription request.

Figure 15:
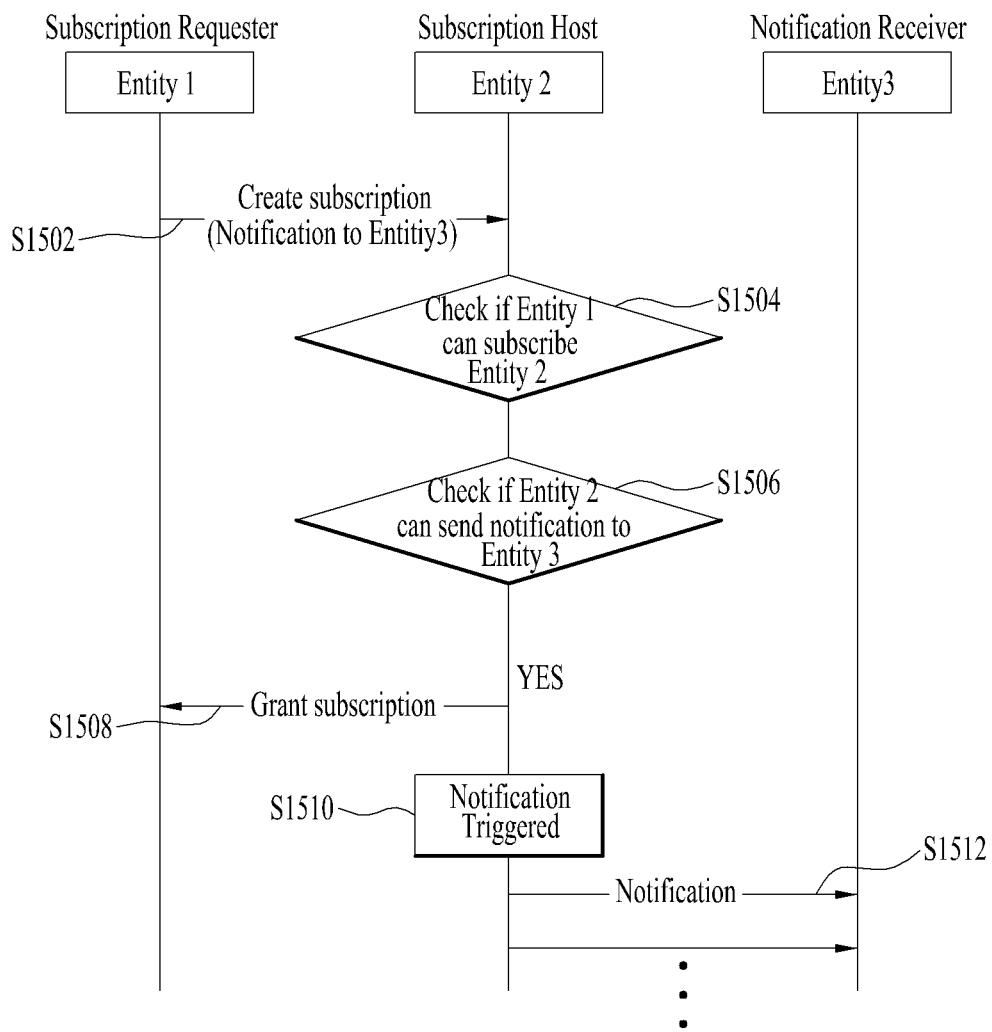
FIG. 15 to FIG. 17 illustrate subscription and notification procedures according to the present invention.

FIG. 15 shows an example of a subscription and notification procedure according to the present invention. FIG. 15 shows an example of applying Method 1 according to the present invention.

Referring to FIG. 15, in order to solve a problem of the aforementioned subscription/notification procedure (e.g., see FIG. 14), it is able to additionally verify whether or not the hosting entity (e.g., entity 2) has a right capable of transmitting a notification to the notification receiver (e.g., entity 3) [S1506]. Hence, when the hosting entity (e.g., entity 2) receives a subscription request from the request originator (e.g., entity 1), the hosting entity (e.g., entity 2) checks not only whether or not the request originator (e.g., entity 1) has a right capable of subscribing the hosting entity (e.g., entity 2) but also whether or not the hosting entity (e.g., entity 2) has a right capable of transmitting a notification to the notification receiver (e.g., entity 3) [S1506]. In the example of FIG. 15, although it is depicted as the steps are performed in an order of S1504 and S1506, this is just an example only. The order of performing each step is not restricted by an order. Hence, the step S1504 and the step S1506 can be performed in a different order than the depicted order if necessary. The steps S1502, S1508 S1510 and S1512 may correspond to the steps S1202, S1206, S1302, and S1306, respectively. Hence, the explanation related to FIG. 12 and FIG. 13 is incorporated herein by reference.

Although the request originator (e.g., entity 1) has a malicious intention, if the hosting entity (e.g., entity 2) has no right capable of transmitting a notification to the notification receiver (e.g., entity 3), a subscription request cannot be granted. Hence, if Method 1 according to the present invention is applied, it is able to avoid a problem such as network load increase and system capability degradation due to an attack of the request originator (e.g., entity 1) with a malicious intention attacking the hosting entity (e.g., entity 2) and the notification receiver (e.g., entity 3).

Method 2 (Subscription Host Performs Verification)

If Method 1 according to the present invention is applied, it may be able to prevent a case that the request originator (e.g., entity 1) corresponds to a malicious entity not having a right capable of changing a configuration of the notification receiver (e.g., entity 3). Yet, the hosting entity (e.g., entity 2) may have a right capable of transmitting a notification to the notification receiver (e.g., entity 3) irrespective of a subscription request of the request originator (e.g., entity 1) or due to another entity having a right capable of changing a configuration of the notification receiver (e.g., entity 3). For example, when Method 1 is applied only, if the hosting entity (e.g., entity 2) has a right capable of transmitting a notification to the notification receiver (e.g., entity 3), the hosting entity (e.g., entity 2) may transmit a notification to the notification entity (e.g., entity 3). Yet, for example, the hosting entity (e.g., entity 2) may obtain the right capable of transmitting a notification to the notification receiver (e.g., entity 3) due to another entity (e.g., entity 4) having a right capable of changing a configuration of the notification receiver (e.g., entity 3). Hence, there is a possibility that the request originator (e.g., entity 1) uses the right obtained by the request of the another entity (e.g., entity 4) without permission. In this case, it is necessary to have a method of making the hosting entity (e.g., entity 2) reject the corresponding request.

In order to solve the aforementioned problem, a procedure of the hosting entity (e.g., entity 2) verifying whether or not the request originator (e.g., entity 1) has a right (or access right) for the notification receiver (e.g., entity 3) is added in Method 2 according to the present invention. If the request originator (e.g., entity 1) does not have the right (access right) for the notification receiver (e.g., entity 3), the hosting entity (e.g., entity 2) rejects a subscription request received from the request originator (e.g., entity 1) and may be able to transmit a response message including a failure result to the request originator (e.g., entity 1). On the contrary, if the request originator (e.g., entity 1) has the right (access right) for the notification receiver (e.g., entity 3), the hosting entity (e.g., entity 2) grants a subscription request and may be able to transmit a response message including a success result to the request originator (e.g., entity 1).

As another example, it may be able to verify whether or not the notification receiver (e.g., entity 3) has a right for configuring subscription on behalf of another entity in order to receive a notification.

Figure 16:
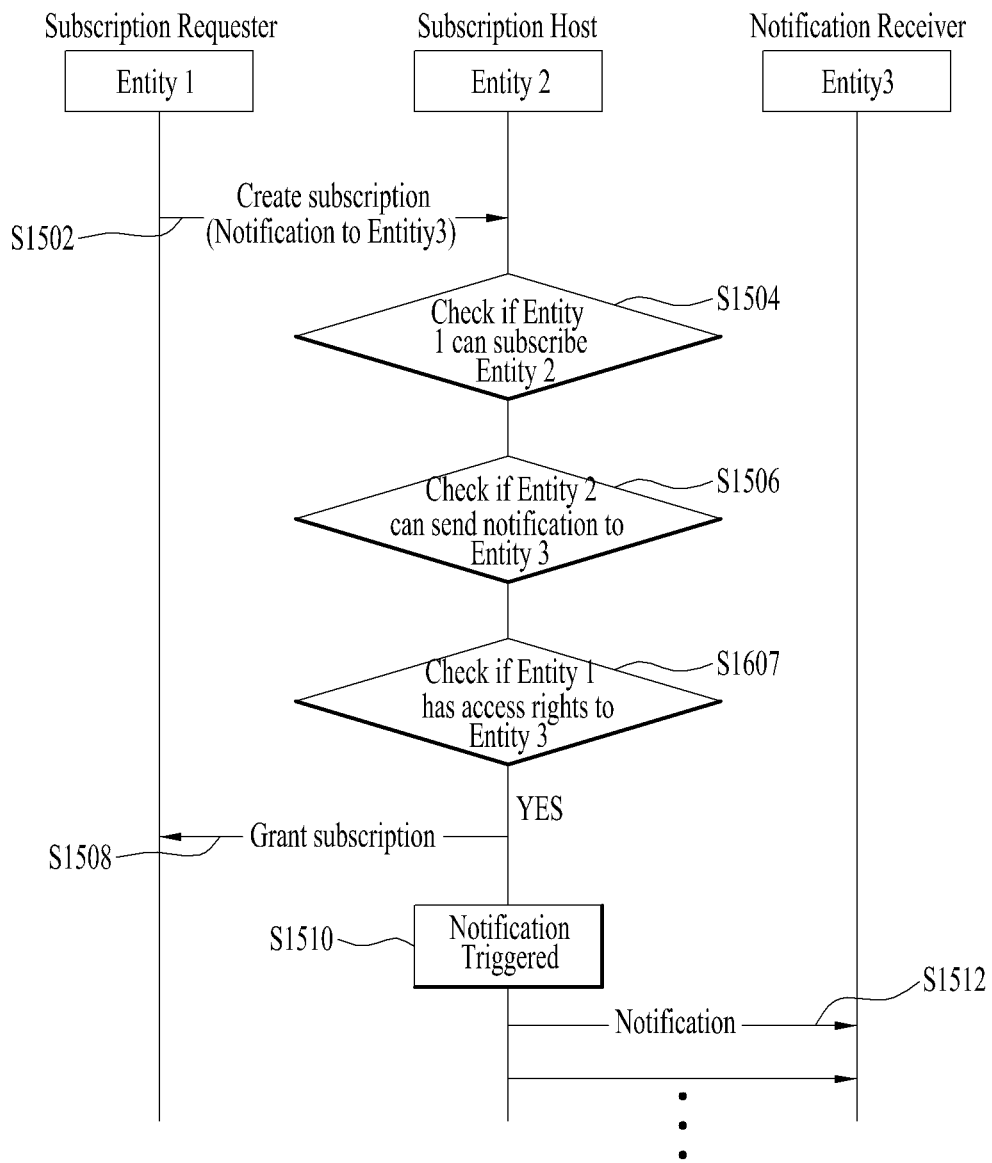

FIG. 16 shows an example of a subscription and notification procedure according to the present invention. It is possible to apply both Method 1 and Method 2 according to the present invention at the same time if necessary. FIG. 16 shows an example of applying both Method 1 and Method 2 according to the present invention at the same time. Yet, this is just an example only. Method 1 and Method 2 according to the present invention may be independently applied.

Referring to FIG. 16, in order to solve a problem of the aforementioned subscription/notification procedure, whether or not the request originator (e.g., entity 1) has a right to the notification receiver (e.g., entity 3) is additionally verified [S1607]. Hence, when the hosting entity (e.g., entity 2) receives a subscription request from the request originator (e.g., entity 1), the hosting entity (e.g., entity 2) checks not only whether or not the request originator (e.g., entity 1) has a right capable of subscribing the hosting entity (e.g., entity 2) [S1504] but also whether or not the hosting entity (e.g., entity 2) has a right capable of transmitting a notification to the notification receiver (e.g., entity 3) [S1506]. In addition, whether or not the request originator (e.g., entity 1) has a right for the notification receiver (e.g., entity 3) (or a right capable of transmitting a notification message or a right capable of configuring subscription for transmitting a notification message) is verified [S1607]. The verification according to the step S1506 and the verification according to the step S1607 may be performed when the request originator (e.g., entity 1) and the notification receiver (e.g., entity 3) are different from each other. In the example of FIG. 16, although it is depicted as the steps are performed in an order of S1504, S1506 and S1607, this is just an example only. The order of performing each step is not restricted by an order. Hence, the step S1504, the step S1506 and the step S1607 may be performed in an order different than the depicted order if necessary.

If both Method 1 and Method 2 are applied at the same time, the request originator (e.g., entity 1) may set in advance two privileges to the notification receiver (e.g., entity 3) in order to configure, to the hosting entity (e.g., entity 2), a subscription resource for transmitting a notification to the notification receiver (e.g., entity 3). A first privilege is a privilege of the hosting entity (e.g., entity 2) capable of transmitting a notification to the notification receiver (e.g., entity 3) and a second privilege is a privilege (e.g., a right of the entity 1 for requesting a notification) of the request originator (e.g., entity 1) capable of configuring the notification receiver (e.g., entity 3) as a notification target. And, as mentioned in the foregoing description, the hosting entity (e.g., entity 2) may grant subscription after checking whether or not the request originator (e.g., entity 1) and the hosting entity (e.g., entity 2) have a right for the notification receiver (e.g., entity 3). The hosting entity (e.g., entity 2) may check the right of the request originator (e.g., entity 1) and right of the notification receiver (e.g., entity 3) through privilege information owned by the notification receiver (e.g., entity 3).

If Method 2 according to the present invention is applied, it may be able to avoid a problem of using the right for the notification receiver (e.g., entity 3), which is already set to the hosting entity (e.g., entity 2), without permission. Hence, it is able to avoid a problem of network load increase or system capability degradation between the hosting entity (e.g., entity 2) and the notification receiver (e.g., entity 3) due to the use of the right without permission.

And, if Method 1 and/or Method 2 according to the present invention is applied, it is able to prevent a subscription/notification mechanism from being viciously used when the request originator (e.g., entity 1) for subscription request and the notification receiver (e.g., entity 3) are different from each other.

Method 3 (Subscription Verification by Notification Receiver)

In case of Method 1 and Method 2 according to the present invention, since it is necessary for the hosting entity (e.g., entity 2) to perform a process of obtaining privilege information configured in the notification receiver (e.g., entity 3) in order to additionally perform a verification process (e.g., S1506 and S1607), it may be inefficient. In order to improve the aforementioned problem, Method 3 according to the present invention proposes that the hosting entity (e.g., entity 2) requests the notification receiver (e.g., entity 3) to perform an additional verification process (e.g., S1506 and S1607) without the hosting entity performing the additional verification process, the notification receiver (e.g., entity 3) performs the additional verification process and returns a result of the additional verification process to the hosting entity (e.g., entity 2).

Checking a right by the hosting entity (e.g., entity 2) according to Method 1 and Method 2 can be performed only when the hosting entity (e.g., entity 2) successfully obtains information on a most recent right for the notification receiver (e.g., entity 3). If the information is not obtained, it is unable to perform successful verification and a process of obtaining the information on the right to the notification receiver (e.g., entity 3) may be a burden to the hosting entity (e.g., entity 2). Hence, when Method 1 and/or Method 2 are applied, if verification is performed by the hosting entity (e.g., entity 2) (notification transmitter), it may be difficult to obtain the information on the right, or may cause overhead for obtaining/checking the corresponding right. On the contrary, in case of applying Method 3, since the notification receiver (e.g., entity 3) having the information on the right performs verification, it is able to more efficiently perform the verification.

Assume that information on a right is set to the notification receiver (e.g., entity 3) in advance. Since a notification message corresponds to a request message (e.g., NOTIFY request), the notification message can include identification information (e.g., fr) of the hosting entity (e.g., entity 2) which is configured to generate and transmit the notification message. Hence, the notification receiver (e.g., entity 3) may verify whether or not the hosting entity (e.g., entity 2) has a right capable of transmitting a notification message to the notification receiver (e.g., entity 3) based on the identification information of the hosting entity (e.g., entity 2) included in the notification message and the information on the right set to the notification receiver in advance. In doing so, the notification receiver (e.g., entity 3) may perform an operation corresponding to Method 1 of the present invention.

And, the notification message may include identification information of a subscription creator (or a request originator) (e.g., entity 1) in order to enable the notification receiver (e.g., entity 3) to perform an operation corresponding to Method 2 of the present invention. And, attribute information for storing the identification information of the subscription creator (or request originator) to be included in the notification message may be added to a subscription resource. For example, the subscription resource may include attribute information (e.g., creator attribute) for indicating identification information of an entity or a device which has created the subscription resource. In the present specification, for clarity, the attribute information (e.g., creator attribute) for indicating the identification information of the entity or the device, which has created the subscription resource, may be referred to as creator attribute information. For example, the creator attribute information may include address information (e.g., URI) of an entity or a device which has created the creator. Hence, if the subscription creator (or the request originator) (e.g., entity 1) transmits a subscription request message to the hosting entity (e.g., entity 2), the hosting entity (e.g., entity 2) may configure the creator attribute information (e.g., creator attribute) based on identification information (e.g., fr) of the subscription creator (or the request originator) (e.g., entity 1) included in the subscription request message. Subsequently, when the notification message is transmitted, the hosting entity (e.g., entity 2) may transmit the notification message in a manner of including the identification information of the subscription creator (or the request originator) (e.g., entity 1) in the notification message. Hence, the notification receiver (e.g., entity 3) may verify whether or not the subscription creator (or the request originator) (e.g., entity 1) has a right capable of transmitting the notification message to the notification receiver (e.g., entity 3) (or whether or not the subscription creator has an access right to the notification receiver or whether or not the subscription creator has a right capable of configuring subscription for transmitting the notification message to the notification receiver) based on the identification information of the subscription creator (or the request originator) (e.g., entity 1) included in the notification message and information on a right configured in advance. In doing so, the notification receiver (e.g., entity 3) may perform an operation corresponding to Method 2 of the present invention.

In Method 3 according to the present invention, the notification message transmitted to the notification receiver (e.g., entity 3) may be generated and transmitted by an occurrence of a notification event, or may be generated for the hosting entity (e.g., entity 2) to request verification irrespective of the occurrence of the notification event. If the request originator (e.g., entity 1) and the notification receiver (e.g., entity 3) are different from each other, the notification message transmitted to the notification receiver (e.g., entity 3) may include parameter information (e.g., verificationRequest) for indicating a verification request to check a right according to the present invention. For example, if the notification receiver (e.g., entity 3) transmits the notification message according to Method 3 of the present invention, the parameter information (e.g., verificationRequest) may be configured as a specific value (e.g., TRUE).

Figure 17:
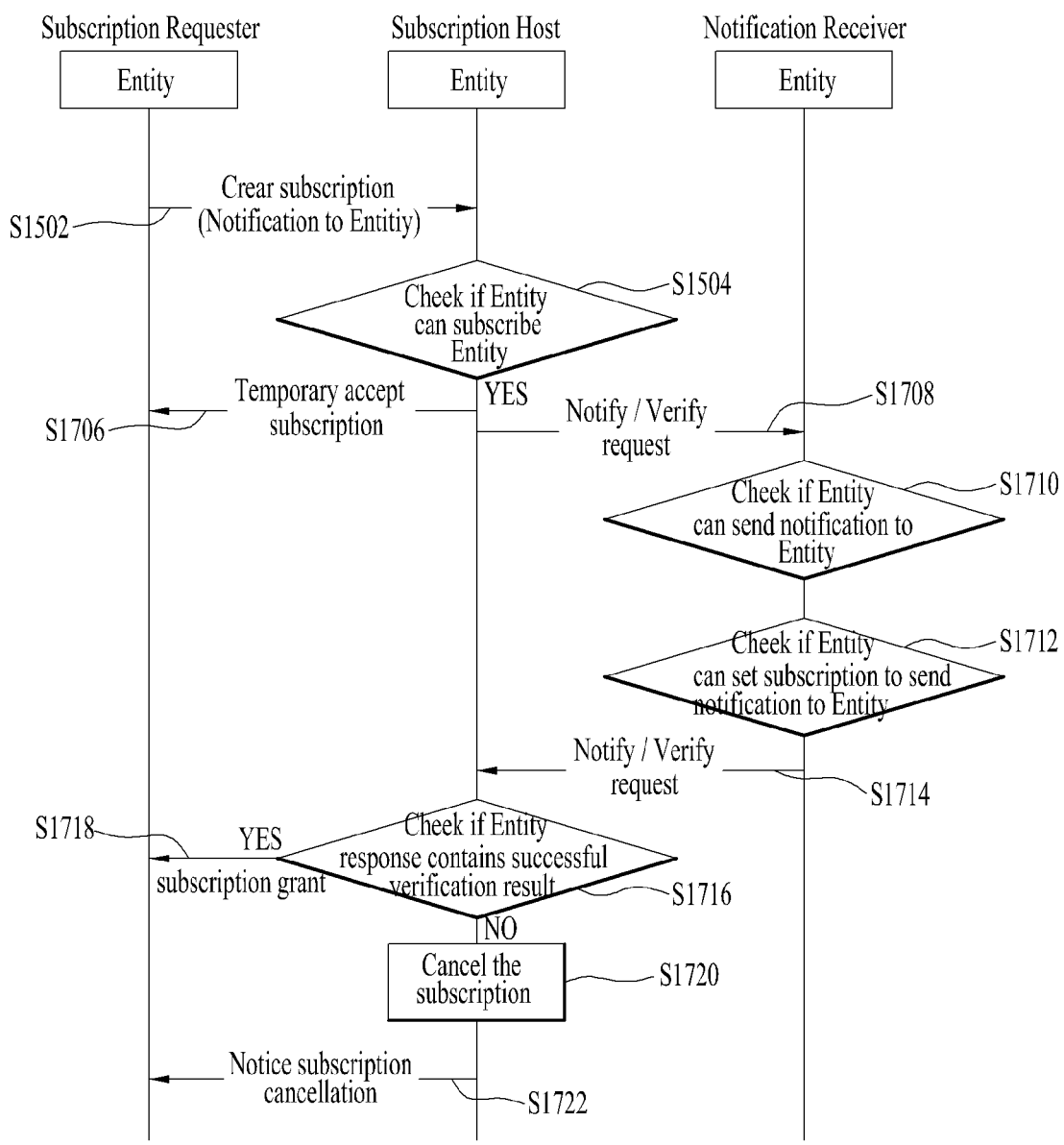

FIG. 17 shows an example of a subscription and notification procedure according to the present invention. FIG. 17 shows an example of Method 3 according to the present invention. Referring to the example of FIG. 17, the hosting entity (e.g., entity 2) may receive a response in response to at least one or more notification messages (or a NOTIFY request) from the notification receiver (e.g., entity 3) for the purpose of verification. For example, the received response may correspond to a response message of a firstly received notification message after subscription is granted. As compared to the examples of FIG. 15 and FIG. 16, according to the example of FIG. 17, the hosting entity (e.g., entity 2) successfully performs checking of a right of the request originator (e.g., entity 1) (e.g., checking whether or not the request originator (e.g., entity 1) has a right for a subscription target resource or a subscription resource) [S1704] and the hosting entity (e.g., entity 2) may immediately transmit an acknowledgement to the request originator (e.g., entity 1) in response to a subscription request [S1706]. The acknowledgement transmitted in the step S1706 may indicate that the hosting entity (e.g., entity 2) has temporarily accepted the subscription request. The hosting entity (e.g., entity 2) may temporality grant the subscription request or internally store relevant information until whether or not a response received from the notification receiver (e.g., entity 3) includes a successful verification result is checked [S1716].

In the step S1706, the hosting entity (e.g., entity 2) may inform the request originator (e.g., entity 1) of status information of a subscription grant procedure. For example, in case of a non-blocking mode (e.g., refer to the description related to FIG. 9 to FIG. 11), the hosting entity (e.g., entity 2) creates/grants subscription in the step S1706 and reconfirms verification in the step S1718 after the verification is successfully performed. Or, subscription may be deleted/rejected/cancelled in the step S1720 after verification is failed. As another example, in case of a blocking mode (e.g., refer to the description related to FIG. 7 and FIG. 8), the hosting entity (e.g., entity 2) postpones granting subscription in the step S1706, and the hosting entity (e.g., entity 2) may grant the subscription in the step S1718 after verification is successfully performed, or may reject the subscription in the step S1720 after verification is failed. The step S1706 may be optional.

In the step S1708, the hosting entity (e.g., entity 2) may transmit a notification message to the notification receiver (e.g., entity 3) which is a notification target. As mentioned in the foregoing description, the notification message transmitted to the notification receiver (e.g., entity 3) in the step S1708 may be generated and transmitted by an occurrence of a notification event or the notification message may be generated for the hosting entity (e.g., entity 2) to request verification irrespective of the occurrence of the notification event. The hosting entity (e.g., entity 2) transmits the notification message to the notification receiver (e.g., entity 3) and requests a response to the notification message. In this case, the notification receiver (e.g., entity 3) checks whether or not the hosting entity (e.g., entity 2) has a right capable of transmitting a notification to the notification receiver. If the hosting entity does not have the right capable of transmitting the notification to the notification receiver, the notification receiver may transmit a failure response message in the step S1714. In this case, the hosting entity (e.g., entity 2) checks the result through the failure response message and may delete a corresponding subscription resource later. The deletion of the corresponding subscription resource may be notified to the request originator (e.g., entity 1).

In the step S1708, the hosting entity (e.g., entity 2) may determine whether or not the request originator (e.g., entity 1) is identical to the notification receiver (e.g., entity 3). For example, the hosting entity (e.g., entity 2) may determine whether or not the request originator (e.g., entity 1) is identical to the notification receiver (e.g., entity 3) based on identification information of the request originator (e.g., entity 1) and identification information of the notification receiver (e.g., entity 3). For example, the identification information (or address information) of the request originator (e.g., entity 1) may be obtained from fr information of a subscription request. For example, the identification information (or address information) of the notification receiver (e.g., entity 3) may be obtained or extracted/inferred from notification target attribute information (e.g., notification-URI) of a subscription resource. If the request originator (e.g., entity 1) and the notification receiver (e.g., entity 3) are different from each other, the hosting entity (e.g., entity 2) may transmit a notification message.

In the step S1708, if a notification target is not the request originator (e.g., entity 1) (or if the request originator (e.g., entity 1) and the notification receiver (e.g., entity 3) are different from each other), the hosting entity (e.g., entity 2) may include the identification information of the request originator (e.g., entity 1) as well as identification information of the hosting entity (e.g., entity 2), which is a notification transmitter, in a notification message generated by an occurrence of a notification event. To this end, the identification information of the request originator (or a subscription creator) (e.g., entity 1) may be stored in the hosting entity (e.g., entity 2) as a part (e.g., creator attribute information or a creator attribute) of a subscription resource. In the step S1708, a notification message (or a NOTIFY request message) is not required to be transmitted only when a notification event is actually occurred, but a notification message (or a NOTIFY request message) may be arbitrarily transmitted for verification. For example, the step S1708 may be performed after the step S1706 is performed.

In the step S1708, if a notification target is not the request originator (e.g., entity 1) (or if the request originator (e.g., entity 1) and the notification receiver (e.g., entity 3) are different from each other), a notification message may further include parameter information (e.g., verificationRequest) indicating a verification request for checking a right according to the present invention. For example, the parameter information (e.g., verificationRequest) may have a specific data type (e.g., Boolean). And, for example, if the hosting entity (e.g., entity 2) transmits a notification message for checking a right to the notification receiver (e.g., entity 3) in order to perform subscription verification, the parameter information may be configured as a specific value (e.g., TRUE). For example, if the parameter information (e.g., verificationRequest) is configured as a specific value (e.g., TRUE), the notification receiver (e.g., entity 3) may recognize the notification message as a verification request. As another example, if the parameter information (e.g., verificationRequest) is configured as a specific value (e.g., FALSE), the notification receiver (e.g., entity 3) may recognize the notification message as a request message according to a general notification procedure (e.g., due to an occurrence of a notification event).

The notification receiver (e.g., entity 3) may verify whether or not the hosting entity (e.g., entity 2) has a right capable of transmitting a notification message to the notification receiver and/or whether or not a subscription creator (or the request originator) (e.g., entity 1) has a right capable of transmitting a notification message to the notification receiver (or a right capable of configuring subscription for transmitting a notification message to the notification receiver) [S1710, S1712]. The verification procedures may respectively correspond to the step S1506 and the step S1607 as shown in FIG. 15 and FIG. 16. In FIG. 17, an order of performing the S1710 and the S1712 may be changed if necessary.

In the step S1716, the hosting entity (e.g., entity 2) recognizes the step S1706 as a temporary grant or a successful reception of a subscription request until the hosting entity checks that a verification result from the notification receiver (e.g., entity 3) is successful. Hence, the hosting entity may not transmit a notification message (or notify request) to the notification receiver (e.g., entity 3) although a notification event occurs. For example, the hosting entity (e.g., entity 2) receives a subscription request, creates a subscription resource and may then transmit a notification message in the step S1708. In this case, a notification event may occur due to the created subscription resource. However, since checking of a right for the subscription request is not completed yet, although a notification message is generated by the occurred notification event, the notification message may be ignored or may not be transmitted to the notification receiver (e.g., entity 3). Information on a subscription grant status may be stored in the hosting entity (e.g., entity 2) as a part of a subscription resource.

If a response including a result of verification success is received in the step S1714, the hosting entity (e.g., entity 2) may determine subscription verification as success in the step S1716. If a subscription request is temporarily granted or subscription information is internally maintained in the step S1706, the subscription information may be explicitly created/stored. In the step S1718, the hosting entity (e.g., entity 2) may deliver a final subscription grant to a subscription creator (or the request originator) (e.g., entity 1).

On the other hand, if a response including a result of a verification failure is received in the step S1714, or if it is unable to perform verification due to timeout of the response message received in the step S1714, or if it is unable to perform verification since the notification receiver (e.g., entity 3) is unable to recognize the request received in the step S1708, or if a general success response is delivered as a simple meaning of a request message having been received (not including a result of verification success), the hosting entity (e.g., entity 2) recognizes subscription verification as a failure and may cancel a corresponding subscription procedure. As another example, although the notification receiver (e.g., entity 3) transmits a response message including a result of verification success, the hosting entity (e.g., entity 2) may recognize the response message as timeout due to a network problem and the like. Hence, in case of the timeout, the hosting entity (e.g., entity 2) may repeat the step S1708 without cancelling a corresponding subscription procedure.

If the hosting entity (e.g., entity 2) explicitly creates/stores subscription information (or a subscription resource) before the step S1706 is performed, the step S1720 may correspond to a step of deleting the created subscription information (or the subscription resource). On the other hand, if the hosting entity (or entity 2) temporarily or internally maintains the subscription information (or the subscription resource), the step S1720 may correspond to a step of cancelling/deleting the temporary/internal information. In the step S1722, the hosting entity (e.g., entity 2) may inform the subscription creator (or the request originator) (e.g., entity 1) of the cancellation/deletion of the subscription.

In addition, in the step S1702, a subscription request may include a plurality of notification targets and a notification message may be transmitted to a plurality of entities or devices in the step S1708. In this case, the hosting entity (e.g., entity 2) may perform an appropriate action according to a response of the step S1714. For example, the hosting entity may delete/cancel all subscriptions or selectively delete a notification target from among all notification targets. A result of the processing may be delivered to the subscription creator (or the request originator) (e.g., entity 1) in the step S1722.

A request message of the step S1708 may correspond to a Notify request message which is transmitted to the notification receiver (e.g., entity 3) by the hosting entity (e.g., entity 2) when an actual notification event occurs. However, if a corresponding subscription procedure is determined as invalid in the step S1714, there may be a problem of creating/storing unnecessary subscription information between the step S1706 and the step S1716. If a Notify request message of a huge size is transmitted in the step S1708 and verification is determined as failed in the step S1714, it may cause such a problem as unnecessary network resource consumption in the step S1708. Hence, it is not mandatory that a message in the step S1708 should be a Notify request message generated by an actual notification event occurrence. As shown in the drawing, a message may correspond to any message such that a verification request of the hosting entity (e.g., entity 2) can be recognized by the notification receiver (e.g., entity 3). This kind of request message may be referred to as a Verify request message. For example, the Verify request message may correspond to a Notify request message not including contents for a subscription target resource. Hence, although an actual notification event does not occur, it is possible to request verification in a form of the Notify message.

If the hosting entity (e.g., entity 2) requests for verification and the verification is successfully performed, the notification receiver (e.g., entity 3) may return a result of the verification to the hosting entity (e.g., entity 2). Although a message type of the step S1708 does not require transmission of a response or the message does not explicitly require a response, the notification receiver (e.g., entity 3) may unconditionally return a response to the hosting entity.

The subscription creator (or the request originator) (e.g., entity 1) may designate time such that a result message for a verification request of the hosting entity (e.g., entity 2) according to Method 3 of the present invention can be arrived at the hosting entity (e.g., entity 2) from the notification receiver (e.g., entity 3) within specific time. If the result message is not arrived at the hosting entity within the designated time, the hosting entity (e.g., entity 2) recognizes that that the result message is not arrived within the time and may inform the subscription creator (or the request originator) (e.g., entity 1) that the result message is not arrived within the time.

A message transmitted in the step S1718 or the step S1722 may be transmitted through a response message in a synchronous non-blocking mode and a request message in an asynchronous non-blocking mode. Delivering information indicating whether subscription is granted is the same as delivering information indicating whether subscription is canceled, although a message types may be different from each other.

If Method 1 and/or Method 2 is applied, it may prevent another entity from using subscription-related right without permission due to checking a right of only the hosting entity (e.g., entity 2) when performing subscription verification. And, by more strictly performing privilege check for subscription grant, it is able to avoid an attack (e.g., DDoS attack) by a notification of a subscription/notification mechanism.

In case of Method 3, Method 3 includes a merit of subscription verification by the hosting entity (e.g., entity 2). Moreover, since privilege check is directly performed by the notification receiver (e.g., entity 3), it is not necessary for the hosting entity (e.g., entity 2) to obtain information on a right owned by the notification receiver (e.g., entity 3). Hence, it is able to prevent a situation in which verification cannot be performed when the hosting entity (e.g., entity 2) is unable to obtain the information about the right. And, the hosting entity (e.g., entity 2) may distribute a burden of performing the aforementioned procedure, which is performed whenever subscription is requested, to each of notification receivers (e.g., entity 3). And, when a right of the notification receiver (e.g., entity 3) may change after subscription is created, subscription may be canceled due to a verification failure. In order to solve the problem, a verification procedure according to Method 2 may be performed by always maintaining privilege information of the notification receiver (e.g., entity 3) as most recent information by the hosting entity (e.g., entity 2) through a separate procedure. On the contrary, according to Method 3, since the hosting entity (e.g., entity 2) receives a notification response from the notification receiver (e.g., entity 3) without a separate procedure whenever a notification message is transmitted, the hosting entity may receive a verification result based on current privilege information.

Figure 18:
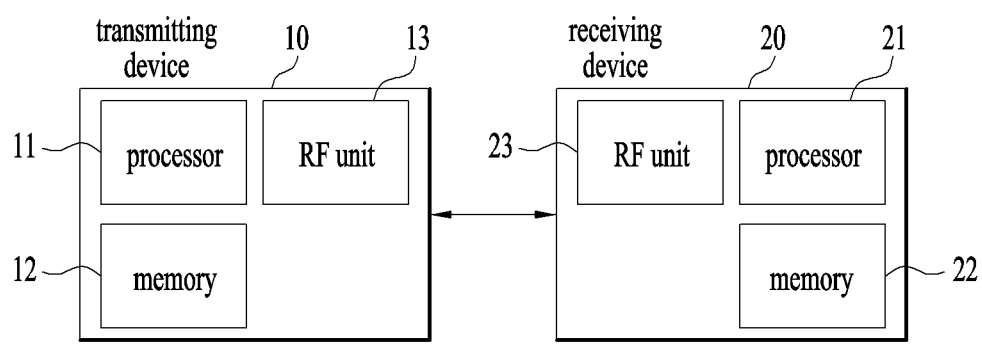
FIG. 18 illustrates a block diagram of a device to which the present invention is applicable.

FIG. 18 illustrates a block diagram of a device according to embodiment(s) of the present invention. In the present invention, each of M2M gateway, M2M server, or M2M device may operate as a transmitting device 10 or a receiving device 20.

The transmitting device 10 and the receiving device 20 respectively include radio frequency (RF) units 13, 23 for transmitting and receiving radio signals carrying information, data, signals, and/or messages, memories 12, 22 for storing information related to communication in a wireless communication system, and processors 11, 21 operatively connected to the RF units 13, 23 and the memories 12, 22 and configured to control the memories 12, 22 and/or the RF units 13, 23 so as to perform at least one of the above-described embodiments of the present invention.

The memories 12, 22 may store programs for processing and control of the processors 11, 21 and may temporarily storing input/output information. The memories 12, 22 may be used as buffers.

The processors 11, 21 control the overall operation of various modules in the transmitting device 10 or the receiving device 20. The processors 11, 21 may perform various control functions to implement the present invention. The processors 11, 21 may be controllers, microcontrollers, microprocessors, or microcomputers. The processors 11, 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11, 21. If the present invention is implemented using firmware or software, firmware or software may be configured to include modules, procedures, functions, etc. performing the functions or operations of the present invention. Firmware or software configured to perform the present invention may be included in the processors 11, 21 or stored in the memories 12, 22 so as to be driven by the processors 11, 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. A signal processing process of the receiving device 20 is the reverse of the signal processing process of the transmitting device 10. Under the control of the processor 21, the RF unit 23 of the receiving device 10 receives RF signals transmitted by the transmitting device 10. The processor 21 decodes and demodulates the radio signals received through the receive antennas and restores data that the transmitting device 10 wishes to transmit.

The RF units 13, 23 include one or more antennas. An antenna performs a function of transmitting signals processed by the RF units 13, 23 to the exterior or receiving radio signals from the exterior to transfer the radio signals to the RF units 13, 23. FIG. 18 illustrates that the transmitting device and the receiving device communicate through RF units respectively, but the present invention is not limited thereto. In the present invention, the transmitting device and the receiving device may communicate through a wired network. In this case, the RF unit may be replaced with a network interface unit (NIU).

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The base station may be referred to as a fixed station, a node-B (NB), an evolved node-B (eNB), an access point (AP), etc. A terminal may be referred to as a user equipment (UE), a mobile station (MS), a mobile subscriber station (MSS), etc.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a communication apparatus such as a terminal, a server, a gateway, etc.

What is claimed is:

1. A method of processing a message for resource subscription by an M2M (machine-to-machine) device, the method comprising:
receiving a subscription request message for a subscription target resource from a first device, wherein the subscription request message contains identification information of the first device and identification information of a second device;
checking whether or not the first device has a right for the subscription target resource;
determining whether or not the first device and the second device are identical based on the identification information of the first device and the identification information of the second device;
when the first device and the second device are different from each other, transmitting a notification message to the second device, the notification message including the identification information of the first device, identification information of the M2M device, and parameter information indicating a verification request; and
receiving a response message from the second device in response to the notification message,
wherein privilege check for the subscription request is performed by the second device based on the identification information of the first device and the identification information of the M2M device, and wherein the response message comprises a result of the privilege check performed by the second device.

2. The method of claim 1, wherein the privilege check performed by the second device includes checking whether or not the M2M device has a right capable of transmitting a notification message to the second device.

3. The method of claim 1, wherein the privilege check performed by the second device includes checking whether or not the first device has a right capable of configuring subscription for transmitting a notification message to the second device.

4. The method of claim 1, further comprising:
transmitting a temporary acceptance message for the subscription request message to the first device before the step of transmitting the notification message to the second device.

5. The method of claim 1, further comprising:
determining whether or not a result of the privilege check performed by the second device is successful;
when the result of the privilege check is successful, transmitting a subscription grant message to the first device; and
when the result of the privilege check is failure, cancelling the resource subscription.

6. The method of claim 5, further comprising:
when the result of the privilege check is failure, transmitting a message for indicating that the resource subscription has been canceled to the first device.

7. The method of claim 1, wherein the subscription request message comprises subscription information for creating a subscription resource in the M2M device, and
wherein the method further comprises temporarily storing the subscription information.

8. The method of claim 1, wherein the subscription request message comprises subscription information for creating a subscription resource in the M2M device, and
wherein the method further comprises creating a subscription resource based on the subscription information.

9. The method of claim 8, wherein the identification information of the first device is stored in creator attribute information of the subscription resource.

10. The method of claim 8, wherein the notification message is generated when a notification event occurs in the M2M device, and
wherein the notification event comprises a status change of the subscription target resource.

11. The method of claim 1, wherein the notification message is generated in the M2M device irrespective of an occurrence of a notification event.

12. The method of claim 1, wherein the identification information of the first device comprises address information indicating an originator of the subscription request message, and
wherein the identification information of the second device comprises address information indicating a notification target of the notification message.

13. The method of claim 1, wherein the resource corresponds to a data structure capable of being uniquely addressed using a unique address.

14. The method of claim 1, wherein response message type information of the subscription request message indicates one of a blocking request, a synchronous non-blocking request, or an asynchronous non-blocking request.

15. An M2M (machine-to-machine), comprising:
a network interface unit; and
a processor operatively connected to the network interface unit, the processor configured to:
receive a subscription request message for a subscription target resource from a first device, wherein the subscription request message contains identification information of the first device and identification information of a second device,
check whether or not the first device has a right for the subscription target resource,
determine whether or not the first device and the second device are identical based on the identification information of the first device and the identification information of the second device,
when the first device and the second device are different from each other, configured to transmit a notification message to the second device, the notification message including the identification information of the first device, identification information of the M2M device, and parameter information indicating a verification request, and
receive a response message from the second device in response to the notification message,
wherein privilege check for the subscription request is performed by the second device based on the identification information of the first device and the identification information of the M2M device, and
wherein the response message comprises a result of the privilege check performed by the second device.

* * * * *